(12) United States Patent
Kaneko

(10) Patent No.: US 12,223,203 B2
(45) Date of Patent: Feb. 11, 2025

(54) MEMORY SYSTEM AND CONTROL METHOD

(71) Applicant: Kioxia Corporation, Tokyo (JP)

(72) Inventor: Akiyuki Kaneko, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/459,979

(22) Filed: Sep. 1, 2023

(65) Prior Publication Data

US 2024/0176537 A1    May 30, 2024

(30) Foreign Application Priority Data

Nov. 28, 2022    (JP) .................................. 2022-189156

(51) Int. Cl.
  *G06F 3/06*        (2006.01)
(52) U.S. Cl.
  CPC .......... *G06F 3/0658* (2013.01); *G06F 3/0656* (2013.01); *G06F 3/0604* (2013.01); *G06F 3/0679* (2013.01)
(58) Field of Classification Search
  None
  See application file for complete search history.

(56) References Cited

U.S. PATENT DOCUMENTS

| 7,877,569 B2 | 1/2011 | Honda |
| 8,578,127 B2 | 11/2013 | Thatcher et al. |
| 8,938,586 B2 | 1/2015 | Yano et al. |
| 2011/0202704 A1* | 8/2011 | Seo ..................... G06F 13/1673 711/E12.001 |

FOREIGN PATENT DOCUMENTS

| JP | 4773342 B2 | 9/2011 | |
| JP | 5178857 B2 | 4/2013 | |
| WO | WO-2009084724 A1 * | 7/2009 | ............. G06F 12/02 |

* cited by examiner

*Primary Examiner* — Kevin Verbrugge
(74) *Attorney, Agent, or Firm* — Kim & Stewart LLP

(57) ABSTRACT

A memory controller of a memory system includes a host interface, a memory interface, and a write buffer configured to temporarily store data of a second size that is greater than a first size of a sector in each of a plurality of entries. Each of the entries includes a plurality of sectors. The memory controller is configured to select one of the entries in which write data is to be stored, determine whether the selected entry is missing data of any sector, perform a host inquiry by transmitting a request for the missing data, store the missing data in the selected entry, and then perform a write operation to store the data of the selected entry into the nonvolatile memory at a continuous physical address range of the nonvolatile memory.

20 Claims, 27 Drawing Sheets

FIG. 21

| | | Data | | Sector | |
| Sector3 | Sector2 | Sector1 | Sector0 | Valid | |
|---|---|---|---|---|---|
| 0x11111111 | 0x22222222 | 0x33333333 | - | 0b1110 | ←MISSING RATIO 25% |
| - | 0x44444444 | - | 0x55555555 | 0b0101 | ←MISSING RATIO 50% |
| - | - | - | 0x66666666 | 0b0001 | ←MISSING RATIO 75% |
| - | - | - | - | - | |

WRITE BUFFER — 3141

FIG. 24A

WRITE BUFFER — 3141

| | Sector3 | Sector2 | Data Sector1 | Sector0 | Sector Valid |
|---|---|---|---|---|---|
| IN USE | 0x11111111 | 0x22222222 | 0x33333333 | - | 0b1110 |
| IN USE | - | 0x44444444 | - | 0x55555555 | 0b0101 |
| IN USE | - | - | - | 0x66666666 | 0b0001 |
| AVAILABLE | - | - | - | - | - |

USAGE RATIO OF WRITE BUFFER IS 75%

FIG. 24B

WRITE BUFFER — 3141

| | Sector3 | Sector2 | Data Sector1 | Sector0 | Sector Valid |
|---|---|---|---|---|---|
| AVAILABLE | - | - | - | - | - |
| AVAILABLE | - | - | - | - | - |
| IN USE | - | 0x88888888 | - | 0x66666666 | 0b0101 |
| AVAILABLE | - | - | - | - | - |

USAGE RATIO OF WRITE BUFFER IS 25%

MEMORY SYSTEM AND CONTROL METHOD

CROSS-REFERENCE TO RELATED APPLICATION (S)

This application is based upon and claims the benefit of priority from Japanese Patent Application No. 2022-189156, filed Nov. 28, 2022, the entire contents of which are incorporated herein by reference.

FIELD

Embodiments described herein relate generally to a technology for controlling a nonvolatile memory.

BACKGROUND

Recently, memory systems including nonvolatile memory chips are widely used. In such a memory system, a correspondence relationship between logical addresses used for a host to access the memory system and physical addresses of the nonvolatile memory is managed in units of a predetermined management size.

When access by a host to a memory system is executed in units of a size less than the management size in the memory system, it is necessary to execute a read-modify-write operation including an operation of reading data corresponding to the management size including write data that has a size less than the management size, an operation of generating write data corresponding to the management size using the read data and the write data, and an operation of writing the generated write data into the nonvolatile memory.

However, the read-modify-write operation can be a cause for degrading the performance of the memory system.

Therefore, it is desirable to implement a new technique capable of handling fine grained access executed by a host.

BRIEF DESCRIPTION OF THE DRAWINGS

FIG. 21 is a diagram illustrating an example of a state of a write buffer in a memory system according to a second embodiment.

FIGS. 24A and 24B are diagrams illustrating an example of a usage ratio of a write buffer in the memory system according to the third embodiment.

DETAILED DESCRIPTION

Embodiments provide a memory system and a control method capable of handling fine grained access.

In general, according to an embodiment, a memory system includes a nonvolatile memory and a memory controller. The memory controller includes a host interface configured to communicate with a host in accordance with a first interface protocol, according to which write data is communicated in units of a sector having a first size, a memory interface configured to communicate with the nonvolatile memory in accordance with a second interface protocol, write data is communicated in units of a second size greater than the first size, and a write buffer configured to temporarily store data of a third size in each of a plurality of entries thereof. The third size is equal to the second size or 1/N of the second size, N being a natural number. Each of the entries is reserved to store data of a plurality of sectors that are associated with a continuous logical address range. Each of the plurality of sectors has the first size. The memory controller is configured to select one of the entries in which write data is to be stored, determine whether the selected entry is missing data of any sector, in response to determining that the selected entry is missing data of at least one sector, perform a host inquiry by transmitting a request to the host for the missing data via the host interface, in response to receiving the missing data from the host via the host interface, store the missing data in the selected entry, and when the selected entry is not missing data from any of the sectors, perform a write operation to store the data of the third size in the selected entry into the nonvolatile memory at a continuous physical address range thereof.

Hereinafter, embodiments will be described with reference to the drawings.

First Embodiment

Figure 1:
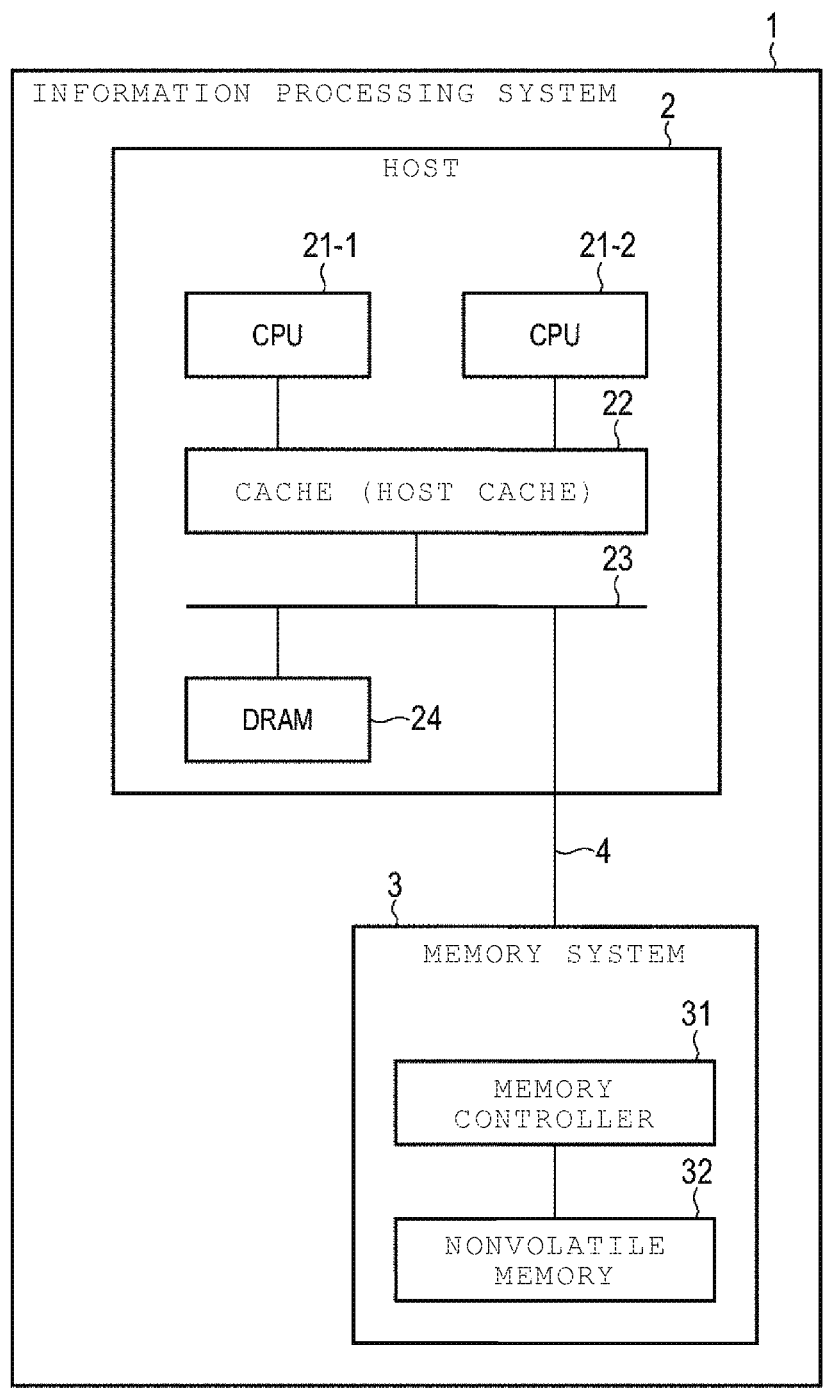
FIG. 1 is a block diagram illustrating a configuration example of an information processing system including a memory system according to a first embodiment.

FIG. 1 is a block diagram illustrating a configuration example of an information processing system 1 including a memory system according to a first embodiment. The information processing system 1 includes a host (may be referred to as host device) 2 and a memory system 3. The host 2 and the memory system 3 can be connected via a memory bus 4. Mutual connection between the host 2 and the memory system 3 via the memory bus 4 can be made according to, for example, a Compute Express Link® (CXL®) standard. CXL is an interface standard for mutual connection between a central processing unit (CPU) of the host, and a device. In an interface according to the CXL standard, a bus according to a PCI Express® (PCIe®) standard is used for the memory bus 4. The memory system 3 is not limited to the interface according to the CXL standard and may be connected to the host 2 via an interface according to another standard.

The host 2 is an information processing device. The host 2 is, for example, a server computer or a personal computer. The host 2 accesses the memory system 3 via the memory bus 4. Specifically, the host 2 transmits a store command, which is a write request for writing data into the memory system 3, via the memory bus 4. The host 2 transmits a load command, which is a read request for reading data from the memory system 3, via the memory bus 4. When the host 2 and the memory system 3 are connected via the interface according to the CXL standard, the store command and the load command are implemented using a CXL.mem protocol defined in the CXL standard.

The host 2 includes one or more CPUs. FIG. 1 illustrates an example of a case where the host 2 includes two CPUs, that is, a CPU 21-1 and a CPU 21-2. The host 2 includes a cache 22, a hardware interface 23 such as an interconnect, a bridge, or a root complex, and a main memory (DRAM) 24. The cache 22 is hardware configured to store a part of data stored in the DRAM 24 and a part of data stored in the memory system 3. More specifically, the cache 22 can be configured to cache, that is, temporarily store read data read from the memory system 3, read data read from the DRAM 24, write data to be written in the memory system 3, and write data to be written in the DRAM 24. The cache 22 can include a cache controller that controls the cache 22 and a memory that stores data. The cache 22 is shared by the CPU 21-1 and CPU 21-2. In the following description, the cache 22 is also referred to as a host cache 22. The hardware interface 23 includes a port to which the DRAM 24 is connected and a port to which the memory system 3 is connected via the memory bus 4. The port to which the DRAM 24 is connected is implemented by, for example, a dual inline memory module (DIMM) interface circuit. The port to which the memory system 3 is connected is implemented by, for example, a CXL interface circuit.

Each of the CPU 21-1 and CPU 21-2 executes software (host software) loaded to the DRAM 24. The host software may be loaded to the DRAM 24 from a storage device (not illustrated) connected to the host 2. The host software includes an operating system, a file system, a device driver, and an application program. Each of the CPU 21-1 and the CPU 21-2 has a virtual storing function. A memory management unit of each of the CPU 21-1 and the CPU 21-2 converts a virtual address used by the application program into a physical address (host physical address). Each of the CPU 21-1 and the CPU 21-2 can access the DRAM 24 and the memory system 3 using the host physical address. The access to the DRAM 24 is implemented using a memory address space allocated to the DRAM 24. The memory address space allocated to the DRAM 24 is a part of the memory address space of the host 2. The access to the memory system 3 is implemented using a memory address space allocated to the memory system 3. The memory address space allocated to the memory system 3 is another part of the memory address space of the host 2.

The memory system 3 is a memory device that includes a nonvolatile memory. The memory system 3 can be connected to the host 2 via the memory bus 4. Each of the CPU 21-1 and the CPU 21-2 makes direct read/write access to the memory system 3 in small units (for example, 64 bytes (B)) via the cache 22 like the DRAM 24 of the host 2. Accordingly, the memory system 3 operates as a so-called memory expansion device. That is, the memory system 3 is a device different from a solid-state drive (SSD) accessed via a storage protocol such as NVMe/SATA in large units such as 4 KiB. The memory system 3 may be implemented as, for example, a type-3 memory device defined according to the CXL standard. The interface connecting the memory system 3 and the host 2 may not be the CXL interface, and the memory system 3 may be implemented as a memory device connected to, for example, a DIMM interface port like the DRAM 24. In any case, data stored in the memory system 3 is cached in the cache 22 similarly to data stored in the DRAM 24. Hereinafter, granularity of data accessed by the host 2 is also referred to as access granularity. Hereinafter, a case where the memory system 3 is connected to the host 2 via the CXL interface will be described as an example.

The memory system 3 includes a memory controller 31 and a nonvolatile memory 32.

The memory controller 31 is a semiconductor circuit such as a system-on-a-chip (SoC). The memory controller 31 controls writing and reading of data in and from the nonvolatile memory 32. The memory controller 31 communicates with the host 2 via the memory bus 4. The memory controller 31 is configured to handle fine access granularity like 64B.

The nonvolatile memory 32 is a nonvolatile semiconductor memory. The nonvolatile memory 32 is, for example, a NAND flash memory. The nonvolatile memory 32 may be implemented by a phase change memory (PCM) or the like. Hereinafter, a case where the nonvolatile memory 32 is implemented as a NAND flash memory will be mainly described. Therefore, hereinafter, the nonvolatile memory 32 is referred to as a NAND flash 32.

The NAND flash 32 is, for example, a flash memory that has a 3-dimensional structure. A memory cell array of the NAND flash 32 is divided into a plurality of planes. The NAND flash 32 includes a plurality of blocks for each plane. Each of the plurality of blocks is a unit of a data erasing operation. Each of the plurality of blocks includes a plurality of pages. Each of the plurality of pages includes a plurality of memory cells connected to a same word line. Each of the plurality of pages is a unit of a data program operation and a data read operation. The data program operation is an operation of writing data in the NAND flash 32. Writing data in the NAND flash 32 is also referred to as programming data in the NAND flash 32. The data read operation is an operation of reading data from the NAND flash 32.

Next, a function executed by the memory controller 31 will be described. The memory controller 31 executes management of data stored in the NAND flash 32 and management of blocks provided in the NAND flash 32.

The management of data includes management of mapping information indicating a correspondence relationship between each of logical addresses and each of physical addresses of the NAND flash 32. The memory controller 31 manages the correspondence relationship between each of the logical addresses and each of the physical addresses using the logical-to-physical address conversion table (L2P table) in units of a predetermined management size. The L2P table is also referred to as a lookup table (LUT). The logical addresses are addresses used by the host 2 (CPU 21-1 and CPU 21-2) to access the memory system 3. Host physical addresses output from the host 2 to the memory bus 4 are used as logical addresses. A physical address is an address indicating an individual storage area (hereinafter referred to as a physical storage area) provided in the NAND flash 32. A physical address is, for example, represented by combining a block address, a page address, and an offset address in a page. Alternatively, the physical address is represented by combining a plane identifier, a block address, a page address, and an offset address in a page. When the NAND flash 32 is configured including a plurality of NAND flash chips, a physical address may be represented by, for example, a channel number, a bank number, a plane identifier, a block address, a page address, and an offset address in a page.

In the NAND flash 32, writing of data in a page in a block can be executed once per one-program/erase cycle of the block. That is, new data cannot be overwritten in a physical storage area in a block in which data is already written. Therefore, when updating data already written in a physical storage area, the memory controller 31 writes new data in an unwritten page (available page) in the block (or another block) and treats previous data as invalid data. In other words, the memory controller 31 writes updated data corresponding to a certain logical address not in a physical storage area where previous data is stored but in another physical storage area. The memory controller 31 updates the logical-to-physical address conversion table and associates a physical address indicating the other physical storage area with the logical address.

The management of a block provided in the NAND flash 32 includes management of defective blocks (bad blocks), wear leveling, and garbage collection (GC) (compaction).

GC is an operation of increasing the number of free blocks. The free block is a block including no valid data. The memory controller 31 manages a state of each block (a free block, an active block, a page in which writing is completed, an available page, an amount of valid data, an amount of invalid data, and the like). During a GC operation, the memory controller 31 selects several blocks in which valid data and invalid data are mixed as GC source blocks. The GC source block is also referred to as a copy source block or a moving source block. The memory controller 31 copies valid data stored in the GC source block to a GC destination block (for example, a free block). The GC destination block is also referred to as a copy destination block or a moving destination block. Here, valid data is data which is associated with a logical address. Data associated with a logical address as latest data is valid data, and is likely to be read later from the host 2. Invalid data is data which is not associated with any logical address. The data which is not associated with any logical address is data which is unlikely to be read later from the host 2. When valid data is copied from the GC source block to the GC destination block, the memory controller 31 updates the logical-to-physical address conversion table and maps a physical address of a copy destination to each of logical addresses of the copied valid data. A block where valid data became invalid data because the valid data was copied to another block is released as a free block. Accordingly, the block can be reused for data writing after the data erasing operation is executed on the block.

Figure 2:
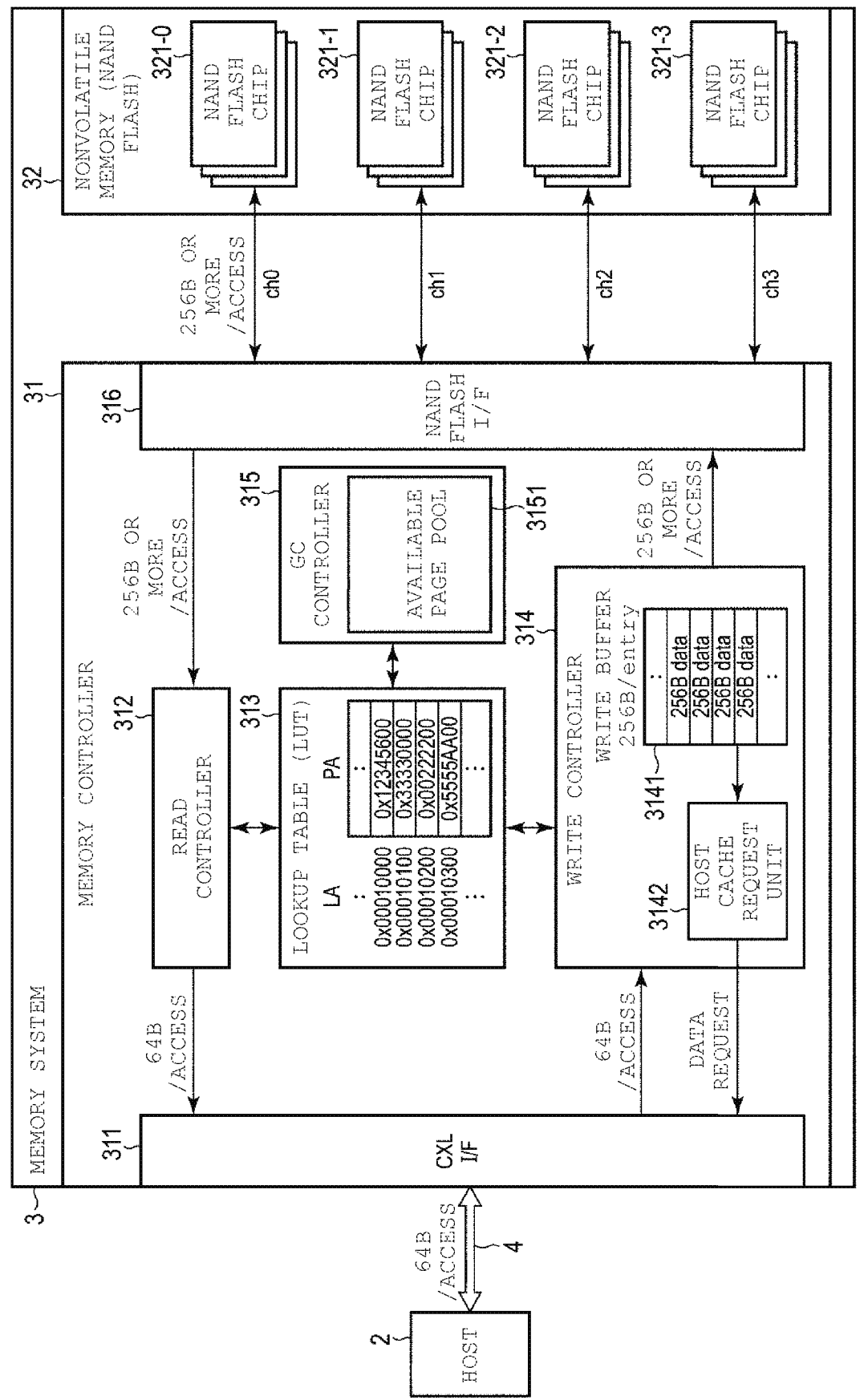
FIG. 2 is a block diagram illustrating a configuration example of each of a memory controller and a nonvolatile memory provided in the memory system.

Next, a configuration of each of the memory controller 31 and the NAND flash 32 in the memory system 3 will be described. FIG. 2 is a block diagram illustrating a configuration example of each of the memory controller 31 and the nonvolatile memory 32.

The memory controller 31 includes a CXL interface 311, a read controller 312, a lookup table (LUT) 313, a write controller 314, a GC controller 315, and a NAND flash interface 316.

The CXL interface 311 is a host interface circuit that executes communication with the host 2. The CXL interface 311 receives a request according to the CXL standard (a read request, a write request, or the like) from the host 2. A read access to the memory system 3 using a read request is executed in, for example, units of 64B. That is, granularity of data subjected to the read access by the host 2 is 64B. Similarly, a write access to the memory system 3 using a write request is executed in, for example, units of 64B. That is, granularity of data subjected to the write access by the host 2 is also 64B.

The read controller 312 is a circuit that executes a read process of reading data from the NAND flash 32. The read controller 312 executes a read process based on each read request received from the host 2 via the CXL interface 311. Each read request includes a parameter for designating a logical address corresponding to read target data. The read target data designated by any read request has the same size (for example, 64B).

The LUT 313 is used as a logical-to-physical address conversion table. The LUT 313 stores mapping information. The mapping information is information indicating a correspondence relationship between each of logical addresses (LA) used by the host 2 to access the memory system 3 and each of physical addresses (PA) of the NAND flash 32. The memory controller 31 manages the correspondence relationship between each of the logical addresses and each of the physical addresses in units of a management size using the LUT 313. The management size is a unit of logical-to-physical address conversion executed using the LUT 313. The management size is set as a size larger than access granularity (here, 64B). One of the reasons for using the management size larger than the access granularity is to reduce a table size of the LUT 313.

For example, it is assumed that the memory system 3 has a capacity of 1 TB. When the management size is 64B, the number of entries necessary in the LUT 313 is 16G because 1 TB/64B=16G. When a physical address is represented with 4 bytes, a size of each entry of the LUT 313 is 4B. Accordingly, a table size of the LUT 313 is 64 GB (=16G*4B).

When the management size is 256B, the number of entries necessary in the LUT 313 is 4G because 1 TB/256B=4G. When a physical address is represented with 4 bytes, a size of each entry of the LUT 313 is 4B. Accordingly, a table size of the LUT 313 is 16 GB (=4G*4B). As such, by using the large management size (for example, 256B), it is possible to significantly reduce the table size of the LUT 313. Hereinafter, it is assumed that the management size is 256B. Here, the LUT 313 manages the correspondence relationship between each of the logical addresses and each of the physical addresses for each logical address range corresponding to 256B. Accordingly, the LUT 313 includes a plurality of entries each corresponding to the plurality of logical addresses continuing at intervals of 256B such as logical address 0, logical address 256, logical address 512, and the like. Hereinafter, a logical address is referred to as LA and a physical address is referred to as PA.

In FIG. 2, among a plurality of entries provided in the LUT 313, an entry corresponding to LA0x0001_0000, an entry corresponding to LA0x0001_0100, an entry corresponding to LA0x0001_0200, and an entry corresponding to LA0x0001_0300 are illustrated as examples. Here, "0x" indicates that a corresponding address is expressed in hexadecimal notation.

In FIG. 2, PA0x1234_5600 is stored in the entry corresponding to LA0x0001_0000. It indicates that 256B data corresponding to continuous logical addresses, that is, 256B data which logically continues, is stored in a physical storage area represented by PA0x1234_5600. That is, 256B data corresponding to 0x0001_0000 to 0x0001_00FF which are 256 LAs is stored in the physical storage area represented by PA0x1234_5600. The physical storage area represented by PA0x1234_5600 is a storage area which physically continues and has a size of 256B.

PA0x3333_0000 is stored in an entry corresponding to LA0x0001_0100. It indicates that 256B data which logically continues, that is, 256B data corresponding to 0x0001_0100 to 0x0001_01FF which are 256 LAs is stored in a physical storage area represented by PA0x3333_0000. The physical storage area represented by PA0x3333_0000 is a storage area which physically continues and has a size of 256B.

PA0x0022_2200 is stored in an entry corresponding to LA0x0001_0200. It indicates that 256B data which logically continues, that is, 256B data corresponding to 0x0001_0200 to 0x0001_02FF which are 256 LAs is stored in a physical storage area represented by PA0x0022_2200. The physical storage area represented by PA0x0022_2200 is a storage area which physically continues and has a size of 256B.

PA0x5555AA00 is stored in an entry corresponding to LA0x00010300. It indicates that 256B data which logically continues, that is, 256B data corresponding to 0x0001_0300 to 0x0001_03FF which are 256 LAs is stored in a physical storage area represented by PA0x5555AA00. The physical storage area represented by PA0x5555 AA00 is a storage area which physically continues and has a size of 256B.

The LUT 313 may include a control circuit that refers to and updates the table where the correspondence relationship between each LA and each PA is managed in addition to the table.

The write controller 314 is a circuit that executes a write process of writing data into the NAND flash 32. The write controller 314 executes the write process based on each write request received from the host 2 via the CXL interface 311. Each write request includes 64B write data and a parameter for designating an LA that is a write destination of the 64B write data.

The GC controller 315 is a circuit that executes garbage collection. The GC controller 315 starts the garbage collection when, for example, the number of free blocks becomes equal to or less than a threshold. The GC controller 315 includes an available page pool 3151. The available page pool 3151 is a list for managing available pages (free pages) among pages provided in the NAND flash 32. The available page is a page that is available for writing of new data. Each of the pages provided in the available block which is a block including no valid data is managed as an available page. Of the pages provided in a block which is being used as a write destination block, a page in which data is not yet written is also managed as an available page.

The NAND flash interface 316 is a memory interface circuit that controls the NAND flash 32. The NAND flash interface 316 transmits a read request for reading data from the NAND flash 32 (NAND read command) to the NAND flash 32 under the control of the read controller 312. The NAND flash interface 316 transmits a program request for writing data into the NAND flash 32 (NAND program command) and write data to the NAND flash 32 under the control of the write controller 314. A unit of reading and writing of data from and in the NAND flash 32 may be a management size of logical-to-physical address conversion or more in principle. That is, a page size of the NAND flash 32 may be the same as a management size of logical-to-physical address conversion or may be a multiple of the management size by an integer that is 2 or more.

The write controller 314 includes a write buffer 3141 and a host cache request unit 3142.

The write buffer 3141 is a storage area where data to be written into the NAND flash 32 is temporarily stored. The write buffer 3141 includes a plurality of entries. Each entry of the write buffer 3141 is used to store 256B data which logically continues.

The host cache request unit 3142 requests data to the host cache 22 of the host 2 via the CXL interface 311. When a part of data which logically continues and has a management size (256B) is not stored in the write buffer 3141, the host cache request unit 3142 transmits a request for designating LAs corresponding to missing data, which is partial data not stored in the write buffer 3141 (referred to as a host cache inquiry or simply an inquiry) to the host 2 via the CXL interface 311. The host cache inquiry is an inquiry for accessing the host cache 22.

For example, when a data write process is executed in the NAND flash 32, the write controller 314 determines whether all of the data which logically continues are stored in the write buffer 3141. The data which logically continues is a set of a plurality of pieces of data respectively corresponding to a plurality of LAs in a management size. A total size of the data which logically continues is equal to the management size. Accordingly, data which logically continues and has a size equal to that of the management size is also referred to as data which logically continues and has the management size. When a part of the data which logically continues is not stored in the write buffer 3141, the write controller 314 identifies LAs corresponding to missing data which is partial data. The write controller 314 transmits an inquiry to the host 2 using the host cache request unit 3142. When 64B data corresponding to the LAs designated by the inquiry is stored in a certain cache line in the host cache 22, the host 2 transmits the 64B data stored in the cache line to the memory system 3.

As such, by transmitting the inquiry for the missing data to the host using the host cache request unit 3142, the write controller 314 can acquire the missing data from the host cache 22. Accordingly, the write controller 314 can write the data which logically continues and has the management size in the NAND flash 32 without executing a process for reading the missing data from the NAND flash 32.

Here, an example of the host cache inquiry will be described. For example, it is assumed that the write controller 314 writes data stored in a certain entry of the write buffer 3141 in the NAND flash 32. Here, an LA range corresponding to the data stored in the entry is determined as an LA range of a write destination.

The write controller 314 determines whether four pieces of 64B data belonging to the LA range of the write destination and corresponding to four LAs continuing at intervals of 64B are all stored in the entry. For example, when one piece of 64B data among the four pieces of 64B data is not stored in the entry, the write controller 314 identifies the LAs corresponding to the 64B missing data which is data not stored in the entry. Then, the write controller 314 transmits an inquiry for designating the LAs corresponding to the 64B missing data that is not stored in the entry to the host 2 using the host cache request unit 3142. When the 64B data corresponding to the LAs designated by the inquiry is stored in a certain cache line in the host cache 22, the host 2 transmits the 64B data stored in the cache line to the memory system 3.

When the missing data is received from the host 2, the write controller 314 stores the received missing data in the entry of the write buffer 3141. When all pieces of data which logically continues and has a size of 256B are lined up in the entry, the write controller 314 writes the data which logically continues, that is, the 256B data which logically continues and includes four pieces of 64B data in a physical storage area represented by a PA allocated to a head LA of an LA range of a write destination.

When two pieces of 64B data among the four pieces of 64B data is not stored in the write buffer 3141, the host cache request unit 3142 first transmits an inquiry corresponding to the first 64B data not stored in the write buffer 3141 to the host 2. When the first 64B data is transmitted from the host 2, the host cache request unit 3142 transmits an inquiry corresponding to the subsequent 64B data not stored in the write buffer 3141 to the host 2. As such, when all of the four pieces of 64B are lined up in the write buffer 3141, the write controller 314 writes the 256B data which logically continues and includes the four pieces of 64B data in the physical storage area represented by the PA allocated to the head LA of the LA range of the write destination.

When the missing data is not in the host cache 22, the write controller 314 acquires the missing data from the NAND flash 32.

The host cache inquiry is made in accordance with, for example, a CXL.cache protocol defined in the CXL standard. The CXL.cache protocol is a protocol for executing a cache operation. The CXL.cache protocol is a protocol for a device such as an accelerator. A memory expansion device operates in accordance with a CXL.mem protocol which is a protocol for memory access rather than the CXL.cache protocol. However, the memory system 3 operates in accordance with both the CXL.mem protocol and the CXL.cache protocol to execute a host cache inquiry. The host cache inquiry is not limited to the CXL.cache protocol and may be implemented in accordance with another interface protocol such as PCIe.

When the host cache inquiry is executed in accordance with the CXL.cache protocol, the inquiry is, for example, CXL.cache CLFlush or CXL.cache RdCurr.

CXL.cache CLFlush is a flush request for requesting to write back 64B dirty data corresponding to an address (LA) designated by a CXL.cache CLFlush from the host cache 22 to the memory system 3. The dirty data is updated data not yet reflected in the memory system 3. When the 64B dirty data corresponding to the LA designated by the CXL.cache CLFlush is stored in a certain cache line of the host cache 22, the 64B dirty data is transmitted (written-back) from the cache line to the memory system 3. Then, a valid flag corresponding to the cache line of the host cache 22 in which the 64B dirty data is stored is changed into a value indicating invalidation. Accordingly, the 64B data stored in the cache line is invalidated.

CXL.cache RdCurr is a cache read request for reading 64B data corresponding to an address (LA) designated by CXL.cache RdCurr from the host cache 22. When the 64B data designated by the LA designated by CXL.cache RdCurr is stored in a certain cache line of the host cache 22, the 64B data is transmitted from the cache line to the memory system 3 even when the 64B data is clean data. The clean data is data already reflected in the memory system 3. A valid flag corresponding to the cache line of the host cache 22 in which the 64B data is stored is maintained as a value indicating validation.

The NAND flash 32 includes a plurality of NAND flash chips 321-0, 321-1, 321-2, 321-3, and the like. The NAND flash 32 includes, for example, twelve NAND flash chips.

Each of the twelve NAND flash chips can operate independently. For example, three NAND flash chips 321-0 are connected to the NAND flash interface 316 via a channel ch0. Three NAND flash chips 321-1 are connected to the NAND flash interface 316 via a channel ch1. Three NAND flash chips 321-2 are connected to the NAND flash interface 316 via a channel ch2. Three NAND flash chips 321-3 are connected to the NAND flash interface 316 via a channel ch3. Here, the NAND flash interface 316 can access the twelve NAND flash chips in parallel via the four channels ch0 to ch3. Here, when three NAND flash chips connected to each channel are provided in a different bank, the NAND flash interface 316 may access three NAND flash chips in parallel for each channel by bank interleave. Accordingly, the NAND flash interface 316 writes data in parallel in a maximum of twelve NAND flash chips (the number of parallel writes=12).

Next, a read process of reading data from the NAND flash 32 will be described. First, the CXL interface 311 receives a read request from the host 2. An LA corresponding to read target data is designated by the received read request. A size of the read target data is 64B. The LA designated by the read request is a head LA among 64 continuing LAs corresponding to the read target data.

The read controller 312 acquires a PA corresponding to the LA designated by the received read request from the LUT 313. Here, the read controller 312 may acquire the PA corresponding to the LA designated by the received read request from the LUT 313 by requesting the PA corresponding to the LA designated by the received read request to the LUT 313 (the control circuit in the LUT 313).

The read controller 312 reads data from the NAND flash 32 via the NAND flash interface 316 based on the acquired PA. Here, the read controller 312 issues the NAND read command designated by the acquired PA to the NAND flash interface 316. The NAND flash interface 316 transmits the issued NAND read command to the NAND flash 32. Accordingly, data is read from the NAND flash 32. The reading of the data from the NAND flash 32 is executed in units of 256B or more.

The read controller 312 extracts 64B read target data from the data read from the NAND flash 32 and transmits the extracted 64B read target data to the host 2 via the CXL interface 311.

Next, a write process of writing data into the NAND flash 32 will be described. First, the CXL interface 311 receives a write request and write data from the host 2. The LA corresponding to the write data is designated by the received write request. A size of the write data is 64B. The LA designated by the write request is a head LA among 64 continuing LAs corresponding to the write data.

The write controller 314 stores the received write data in the write buffer 3141. Here, in one entry of the write buffer 3141, 256B data which logically continues can be stored. That is, the write controller 314 stores the received write data in one entry among a plurality of entries of the write buffer 3141 so that four pieces of 64B data belonging to a certain 256B LA range is stored in the same entry of the write buffer 3141. For example, when other 64B data belonging to the same 256B LA range as the received 64B data is already stored in a certain entry of the write buffer 3141, the write controller 314 stores the received 64B data in the entry.

For example, when the number of available entries of the write buffer 3141 becomes equal to or less than a threshold (e.g., a first threshold), the write controller 314 selects the entry in which data is stored among the plurality of entries of the write buffer 3141 and determines to write the data stored in the selected entry in the NAND flash 32.

Here, to facilitate description, it is assumed that all of the 256B data is stored in the selected entry. The write controller 314 determines a physical storage area in the NAND flash 32 which can be used to write data. Subsequently, the write controller 314 updates the LUT 313 so that the PA indicating the determined physical storage area is allocated to the head LA in the LA range corresponding to the 256B data stored in the selected entry. Here, the write controller 314 may first acquire, from the LUT 313, the PA indicating the physical storage area which can be used to write data from the LUT 313, by transmitting an allocation request to the LUT 313 (the control circuit in the LUT 313) so that the physical storage area which can be used to write data is allocated. The LUT 313 (control circuit in the LUT 313) may allocate the physical storage area based on a list of available pages managed by the available page pool 3151 in response to the allocation request of the physical storage area. The write controller 314 may update the LUT 313 so that the PA indicating the allocated physical storage area is allocated to the head LA in the LA range corresponding to the 256B data stored in the selected entry by transmitting an update request to the LUT 313.

Thereafter, the write controller 314 writes the 256B data stored in the selected entry into the physical storage area allocated in the NAND flash 32. Here, the write controller 314 issues a NAND program command for designating the PA indicating the physical storage area to the NAND flash interface 316. The NAND flash interface 316 transmits the issued NAND program command and the 256B data to the NAND flash 32. Accordingly, the 256B data is written into the physical storage area represented by the PA.

Writing of data into the NAND flash 32 is executed in units of a size of 256B or more. For example, when a page size of the NAND flash 32 is 256B, writing of data into the NAND flash 32 is executed in data units of 256B. When the page size is 4 KiB, writing of data into the NAND flash 32 is performed in units of 4 KiB data. Here, writing of 4 KiB data may be performed after 256B*16 pieces of data are lined up in 16 entries of the write buffer 3141.

Figure 3:
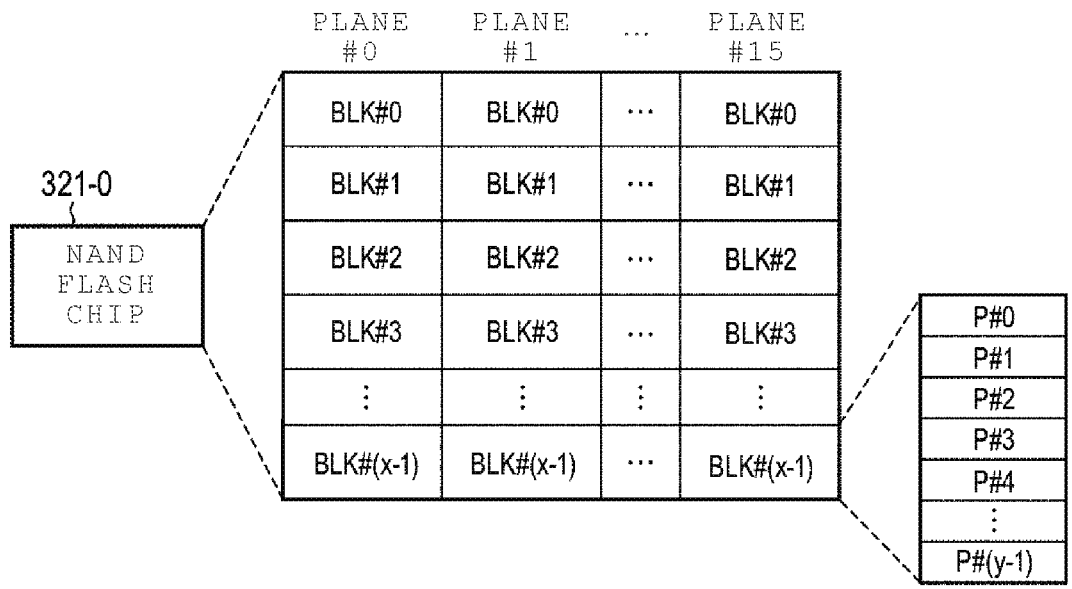
FIG. 3 is a block diagram illustrating a configuration example of a NAND flash chip provided in the memory system.

Next, a configuration example of the NAND flash chip will be described. FIG. 3 is a block diagram illustrating a configuration example of the NAND flash chip provided in the memory system according to the first embodiment.

The NAND flash chip 321-0 has a multi-plane configuration including a plurality of planes. A memory cell array of the NAND flash chip 321-0 may be divided into, for example, 16 planes (plane #0 to #15). Each of planes #0 to #15 includes a plurality of blocks BLK #0 to #(x-1). Each of the blocks BLK #0 to BLK #(x-1) includes a plurality of pages (P #0 to P #(y-1)). A page is also referred to as a physical page. A size (page size) of each of pages P #0 to P #(y-1) is, for example, a size of 256B or more. Flash die #0 can operate in a multi-plane mode in which data is simultaneously written in eight planes. Here, the configuration of the NAND flash chip 321-0 has been described. Each of the other NAND flash chips have the same configuration as the NAND flash chip 321-0.

Figure 4:
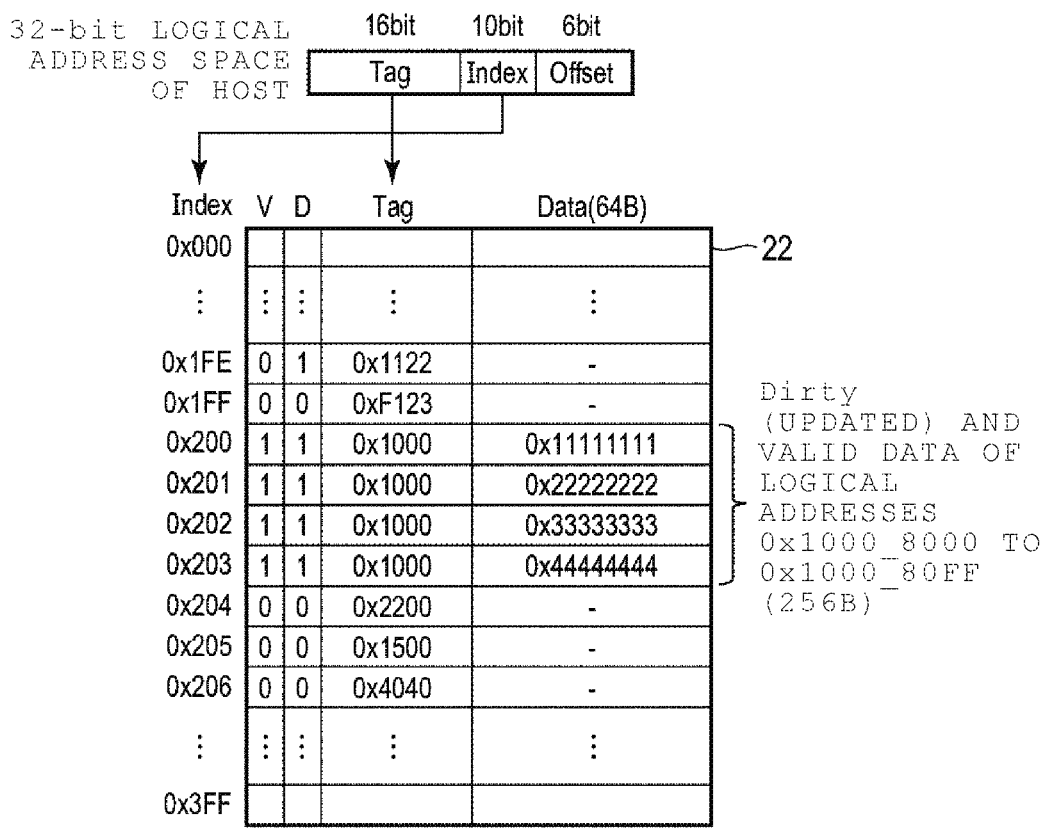
FIG. 4 is a block diagram illustrating a configuration example of a cache of a host.

Next, a configuration example of the host cache 22 will be described. FIG. 4 is a block diagram illustrating a configuration example of the cache of the host. The host cache 22 may be implemented by any of a direct map cache, a set associative cache, and a full associative cache. FIG. 4 illustrates a case where the host cache 22 is implemented as a direct map cache, a cache line size of the host cache 22 is 64B, and a capacity of the host cache 22 is 64 KB.

The host cache 22 includes 1024 cache lines. Data stored in each cache line is 64B data. In FIG. 4, to facilitate description, 4B data is illustrated as data stored in each cache line. Each cache line includes a valid bit (V), a dirty bit (D), and a tag (Tag).

When a logical address space of the host 2 used to access the memory system 3 is represented with a 32-bit logical address, 6 low-order bits in the 32-bit logical address is used as an offset of 64B data. In the 32-bit logical address, middle-order 10 bits are used as an index. In the 32-bit logical address, 16 high-order bits are used as a tag.

1024 indexes 0x000 to 0x3FF are associated with 1024 cache lines of the host cache 22 in a one-to-one correspondence relationship. A cache line in which a certain 64B data is stored is determined uniquely according to a middle-order 10-bit value in the logical address corresponding to 64B data.

The valid bit is a bit indicating whether the corresponding cache line is valid. When the valid bit is 1, the valid bit indicates that the cache line stores valid data. When the valid bit is 0, the valid bit indicates that the cache line does not store valid data.

The dirty bit is a bit indicating whether the data stored in the cache line is dirty data. The dirty data is updated data which is not yet reflected in the memory system 3. Therefore, when the dirty data is flushed from the cache line, it is necessary to write the dirty data back to the memory system 3. Data which is not the dirty data is referred to as clean data. When the dirty bit is 1, the dirty bit indicates that data stored in the cache line is dirty data. When the dirty bit is 0, the dirty bit indicates that the data stored in the cache line is clean data.

The tag indicates whether 64B data corresponding to a certain logical address among logical addresses which continue at intervals of 64B is stored in a corresponding cache line. By combining the tag with the index, it is possible to uniquely identify a logical address corresponding to 64B data stored in the cache line.

In FIG. 4, four tags corresponding to four cache lines to which four indexes 0x200 to 0x203 are allocated have the same value (0x1000). Accordingly, four pieces of 64B data which logically continue (that is, 256B data which logically continues) are stored in the four cache lines. A head LA corresponding to the 256B data which logically continues is represented by a 32-bit binary number including high-order 16-bits represented by the tag (0x1000), middle-order 10 bits represented by the index (0x200), and a 6-bit offset. When the tag 0x1000 is represented by a decimal number, $1*16^3=1*2^{12}$. Therefore, only the 13th digit in the binary number representing the high-order 16 bits corresponding to the tag is 1. When the index 0x200 is represented by a decimal number, $2*162=1*29$. Therefore, only the 10th digit in the binary number representing the middle-order 10 bits corresponding to the tag is 1. Therefore, an LA represented by a binary number of 32 digits is a binary number in which only the 29th digit and the 16th digit are 1. When the binary number is represented by a decimal number, $1*2^{28}+1*2^{15}=1*16^7+8*16^3$. When the decimal number is represented by a hexadecimal number, $1*16^7+8*16^3=$0x1000_8000. Accordingly, the head LA corresponding to the 256B data which logically continues is 0x1000_8000. That is, from the data corresponding to LA0x1000_8000, the 256B data which logically continues corresponds to an LA range of 0x10008000 to 0x100080FF.

In each of the four cache lines to which four indexes 0x200 to 0x203 are allocated, the valid bit is set to 1 and the dirty bit is also set to 1. Therefore, the 256B data which logically continues and is stored in the four cache lines is valid and dirty data. Here, for example, when the cache line to which the index 0x200 is conflict, it is necessary to flush 64B data already stored in the cache line. The 64B flushing target data is data corresponding to LA0x1000_8000 to 0x1000_803F. When the flushing target 64B data is dirty data, the host 2 writes back the 64B flushing target data back to the memory system 3 by issuing a write request designating LA0x1000_8000 to the memory system 3. When a cache flush request is issued from an application or the like, a process of writing 64B data designated by the cache flush request back to the memory system 3 is executed.

Figure 5:
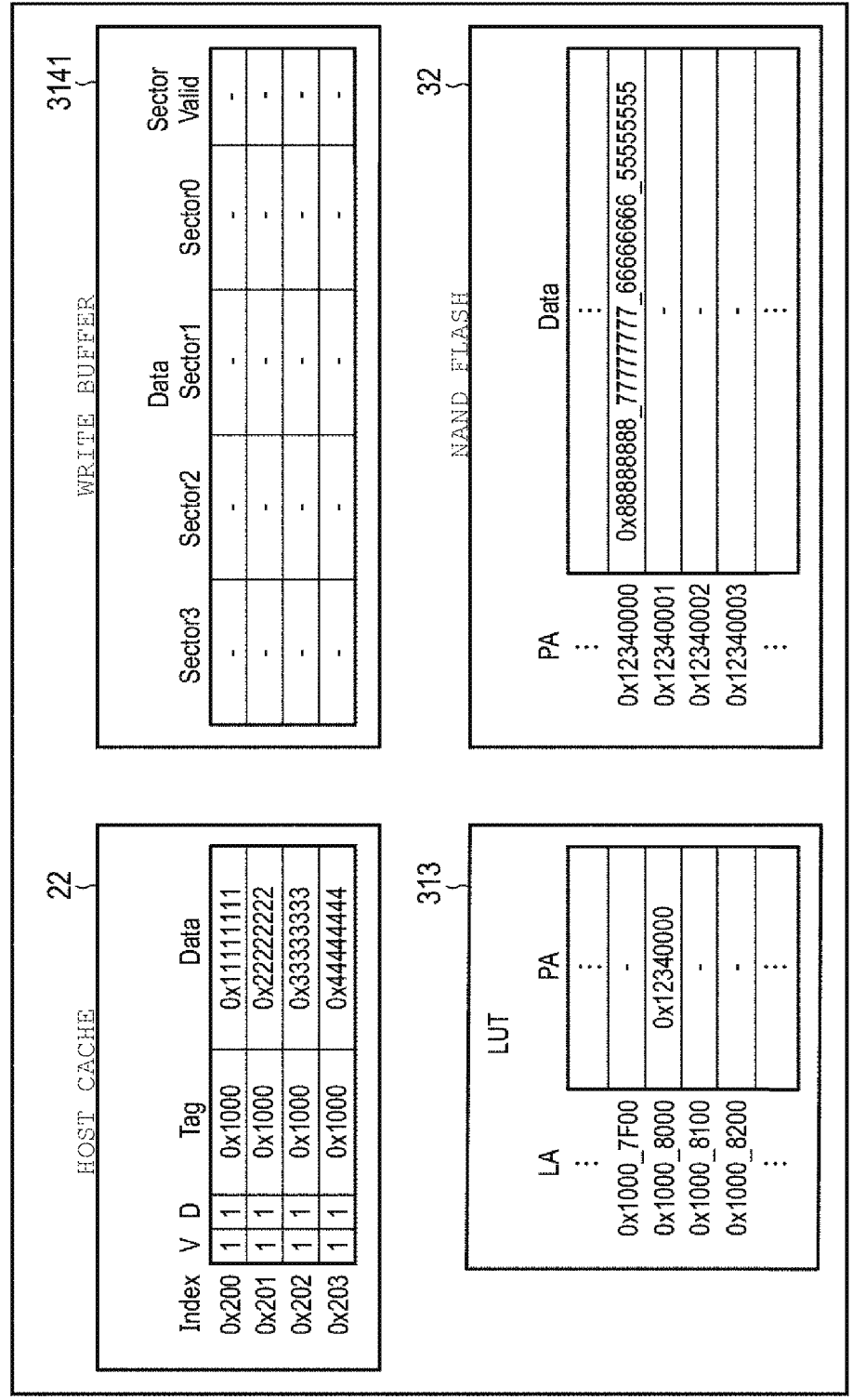
FIG. 5 is a diagram illustrating an example of an initial state of each of the cache, a write buffer, a lookup table, and a NAND flash memory.

Next, a write process in the memory system 3 will be described. First, a write process when 256B data which logically continues is lined up in the write buffer will be described with reference to FIGS. 5, 6, and 7. FIG. 5 is a diagram illustrating an example of an initial state of each of the host cache, the write buffer, the LUT, and the NAND flash.

The host cache 22 has a configuration similar to the configuration described in FIG. 4, and only a configuration corresponding to four cache lines among the plurality of cache lines is illustrated.

The write buffer 3141 includes a plurality of entries. Each entry of the write buffer 3141 stores data and a sector valid. The data stored in each entry is, for example, 256B data which logically continues. Each entry includes a sector 0 (Sector0), a sector 1 (Sector1), a sector 2 (Sector2), and a sector 3 (Sector3). For example, head 64B data among 256B data which logically continues and is to be stored in the entry is stored in the sector 0. 64B data logically subsequent to the 64B data to be stored in the sector 0 is stored in the sector 1. 64B data logically subsequent to the 64B data to be stored in the sector 1 is stored in the sector 2. 64B data logically subsequent to the 64B data to be stored in the sector 2 and located at the end of the data of the 256B data is stored in the sector 3.

The sector valid is bitmap data including four bits respectively corresponding to four sectors provided in the same entry. Each bit of the sector valid indicates whether data stored in the corresponding sector is valid data. For example, a bit corresponding to a sector in which valid data is stored indicates "1". A bit corresponding to a sector in which the valid data is not stored indicates "0". Therefore, for example, when valid data is stored in the sector 0 and the sector 1 and the valid data is not stored in the sector 2 and the sector 3, the sector valid is "0b0011".

The LUT 313 manages a correspondence relationship between each LA and each PA for each management size (here, 256B).

The NAND flash 32 stores data in a physical storage area indicated by the PA. The physical storage area corresponding to one PA is a storage area where 256B data can be stored.

FIG. 5 is a diagram illustrating the host cache 22, the write buffer 3141, the LUT 313, and the NAND flash 32 in an initial state in the write process executed by the memory system 3.

In an initial state, 256B data which logically continues and corresponding to LA0x1000_8000 to 0x1000_80FF is stored as valid and dirty data in the host cache 22. The 256B data is dirty data which is updated after reading from PA0x12340000 of the NAND flash 32.

The 256B data includes four pieces of 64B data, that is, 64B data corresponding to LA0x1000_8000 to 0x1000_803F, 64B data corresponding to LA0x1000_8040 to 0x1000_807F, 64B data corresponding to LA0x1000_8080 to 0x1000_80BF, and 64B data corresponding to LA0x1000_80C0 to 0x1000_80FF.

The 64B data (here, illustrated as "0x11111111") stored in the cache line corresponding to the index 0x200 is first 64B data among the four pieces of 64B data. The first 64B data is data corresponding to LA0x1000_8000 to 0x1000_803F.

The 64B data (here, illustrated as "0x22222222") stored in the cache line corresponding to the index 0x201 is second 64B data among the four pieces of 64B data. The second 64B data is data corresponding to LA0x1000_8040 to 0x1000_807F.

The 64B data (here, illustrated as "0x33333333") stored in the cache line corresponding to the index 0x202 is third 64B data among the four pieces of 64B data. The third 64B data is data corresponding to LA0x1000_8080 to 0x1000_80BF.

The 64B data (here, illustrated as "0x44444444") stored in the cache line corresponding to the index 0x203 is fourth 64B data among the four pieces of 64B data. The fourth 64B data is data corresponding to LA0x1000_80C0 to 0x1000_80FF.

In the write buffer 3141 in the initial state, no data is stored.

In the LUT 313 in the initial state, PA0x1234_0000 is stored in the entry corresponding to LA0x1000_8000.

In the NAND flash 32 in the initial state, old 256B data corresponding to LA0x1000_8000 (here, illustrated as 88888888_77777777_66666666_55555555) corresponding to LA0x1000_8000 is stored in a physical storage area indicated by PA0x12340000.

Figure 6:
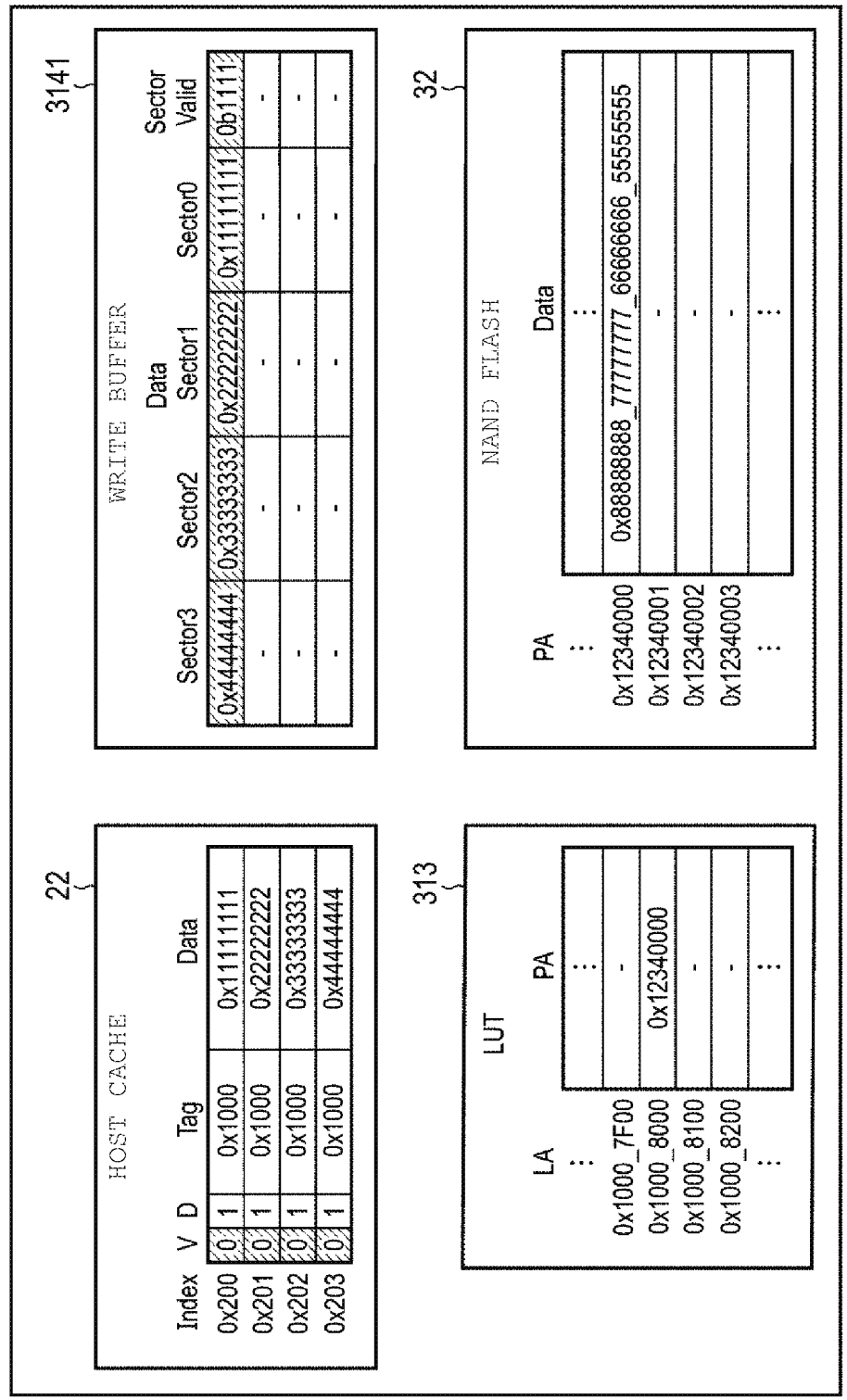
FIG. 6 is a diagram illustrating an example of a state of each of the cache, the write buffer, the lookup table, and the NAND flash memory after writing in the memory system.

Subsequently, it is assumed that 256B data corresponding to LA0x1000_8000 to 0x1000_80FF is flushed from the four cache lines of the host cache 22 and is written into the memory system 3. FIG. 6 is a diagram illustrating an example of states of the cache, the write buffer, the lookup table, and the NAND flash after writing into the memory system according to the first embodiment.

When the 256B data corresponding to LA0x1000_8000 to 0x1000_80FF is flushed from the host cache 22 and is written into the memory system 3, valid bits corresponding to each of the four cache lines corresponding to the indexes 0x200 to 0x203 is changed to "0" indicating invalidation. When the valid bit is changed to "0", the corresponding cache line is invalidated. A value of a dirty bit corresponding to the invalidated cache line enters a don't-care state which is a state where the value is no longer referred to.

The four pieces of 64B data provided in the flushed 256B data, that is, "0x11111111", "0x22222222", "0x33333333", and "0x44444444", are stored in, for example, the first entry of the write buffer 3141. In the first entry of the write buffer 3141, the first 64B data "0x11111111" is stored in the sector 0, the second 64B data "0x22222222" is stored in the sector 1, the third 64B data "0x33333333" is stored in the sector 2, and the fourth 64B data "0x44444444" is stored in the sector 3. The sector valid corresponding to the first entry is set to 0b1111.

Here, the case where the 64B data stored in each of the four cache lines corresponding to the indexes 0x200 to 0x203 is invalidated has been described as an example. However, when the 64B data is stored as valid data, a dirty bit corresponding to each of the cache lines is set to "0" while the valid bit corresponding to each of the cache lines is maintained as "1".

Figure 7:
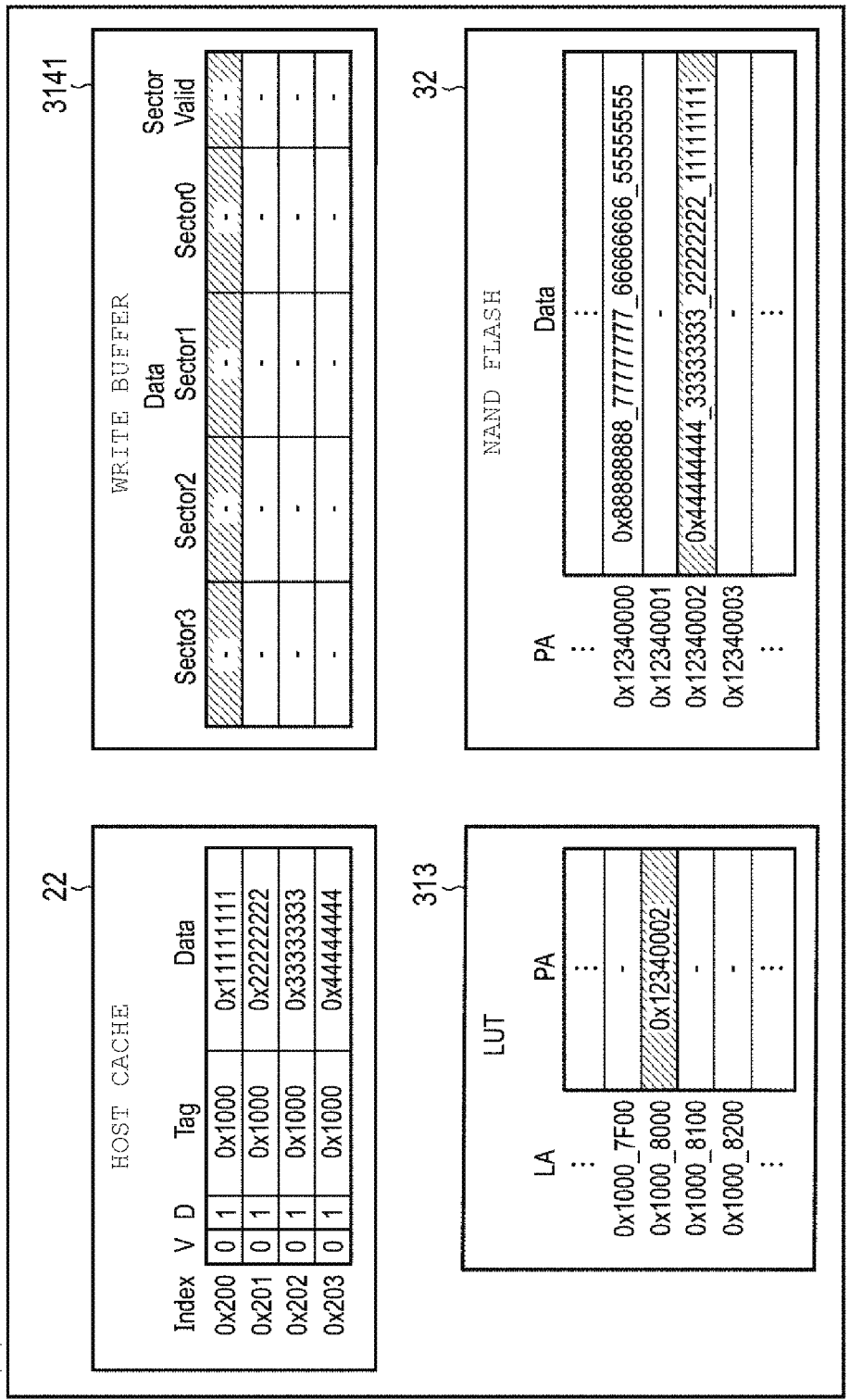
FIG. 7 is a diagram illustrating an example of a state of each of the cache, the write buffer, the lookup table, and the NAND flash memory after programming to the NAND flash memory of the memory system.

Next, the memory system 3 writes data stored in the write buffer 3141 in the NAND flash 32. FIG. 7 is a diagram illustrating an example of states of the cache, the write buffer, the lookup table, and the NAND flash after programming to the NAND flash of the memory system according to the first embodiment.

For example, when the number of available entries of the write buffer 3141 is decreased to a threshold (e.g., first threshold) or less, the memory system 3 determines to write the data stored in one entry among the plurality of entries of the write buffer 3141 into the NAND flash 32. The memory controller 31 selects one entry among the plurality of entries of the write buffer 3141 as a target entry of a program operation (a data write operation) of storing data to be written into the NAND flash 32. Here, it is assumed that the first entry of the write buffer 3141 is selected as a target entry of the program operation.

The memory controller 31 writes 256B data (0x44444444, 0x33333333, 0x22222222, and 0x11111111) stored in the first entry of the write buffer 3141 in a physical storage area in the NAND flash 32 which is different from the physical storage area where 256B data (0x88888888, 77777777, 66666666, and 55555555) corresponding to the LA range (LA0x1000_8000 to 0x1000_80FF) is stored, for example, a physical storage area in the NAND flash 32 represented by PA0x12340002. PA0x12340002 is a new physical address allocated to LA0x1000_8000 which is a head of the LA range (LA0x1000_8000 to 0x1000_80FF).

Then, the memory controller 31 updates the LUT 313 so that PA0x12340002 is associated with LA0x1000_8000. Here, the memory controller 31 updates the entry of the LUT 313 corresponding to LA0x1000_8000 and changes the PA corresponding to LA0x1000_8000 from PA0x12340000 to PA0x12340002. After the operation of updating the LUT 313 is executed, an operation of writing the 256B data in the NAND flash 32 may be executed.

When the 256B data is written into the NAND flash 32, the first entry of the write buffer 3141 becomes an available entry.

Here, an ideal situation where the 256B data which is the management size of the logical-to-physical address conversion is flushed from the host cache 22 at the same time has been described. However, when the management size is larger than the access granularity, it is not assured that data with the management size is necessarily flushed from the host cache 22 at the same time. Then, in the 256B data which logically continues, only partial data may be stored in the write buffer 3141 in some cases.

Next, a write process when data of the management size is not lined up in the write buffer 3141 will be described. Here, it is assumed that a host inquiry is not performed.

Figure 8:
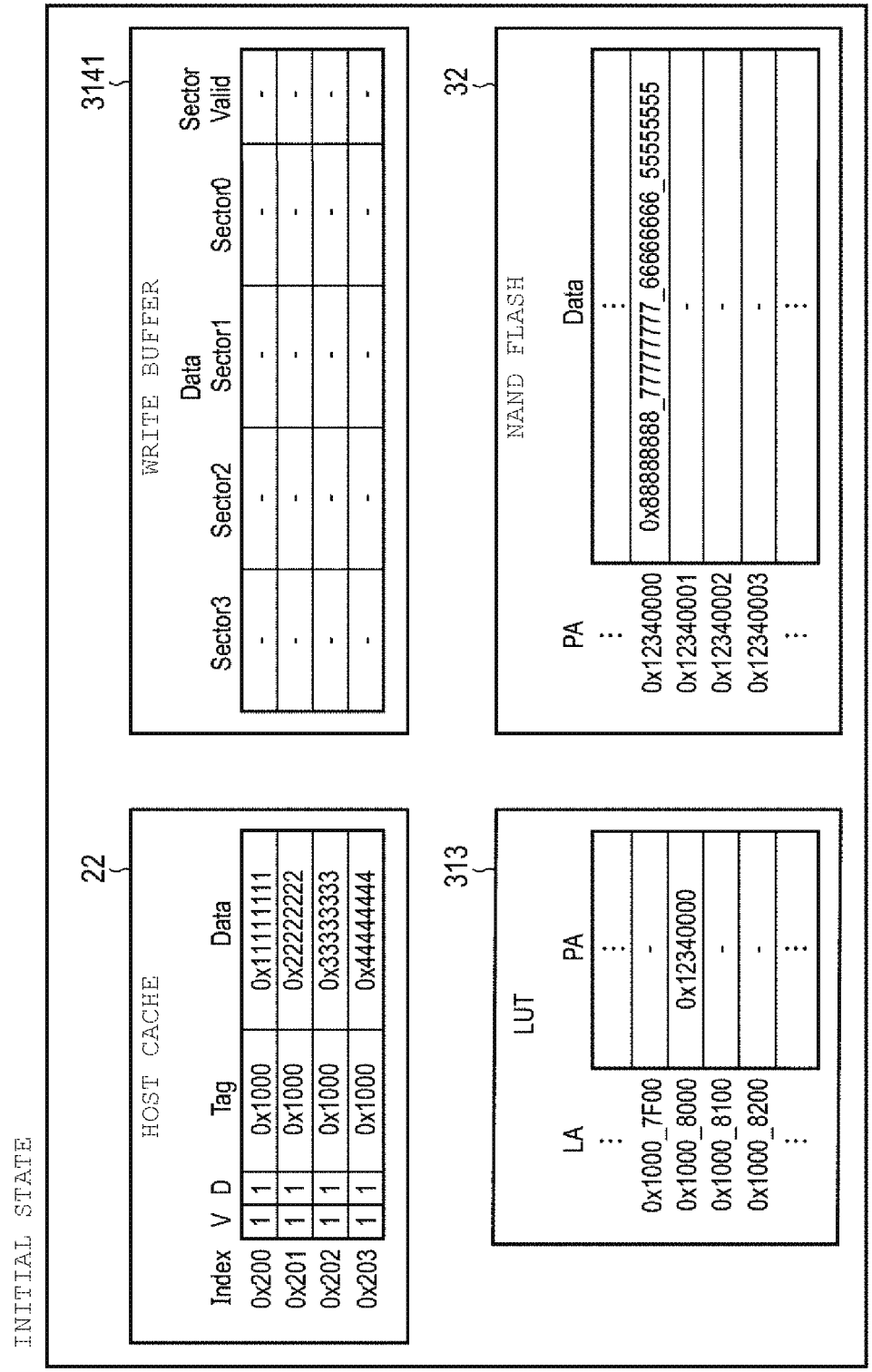
FIG. 8 is a diagram illustrating an example of an initial state of each of the cache, the write buffer, the lookup table, and the NAND flash memory.

First, FIG. 8 is a diagram illustrating an example of an initial state of each of the cache, the write buffer, the lookup table, and the NAND flash and illustrates the same states as those described in FIG. 5.

Figure 9:
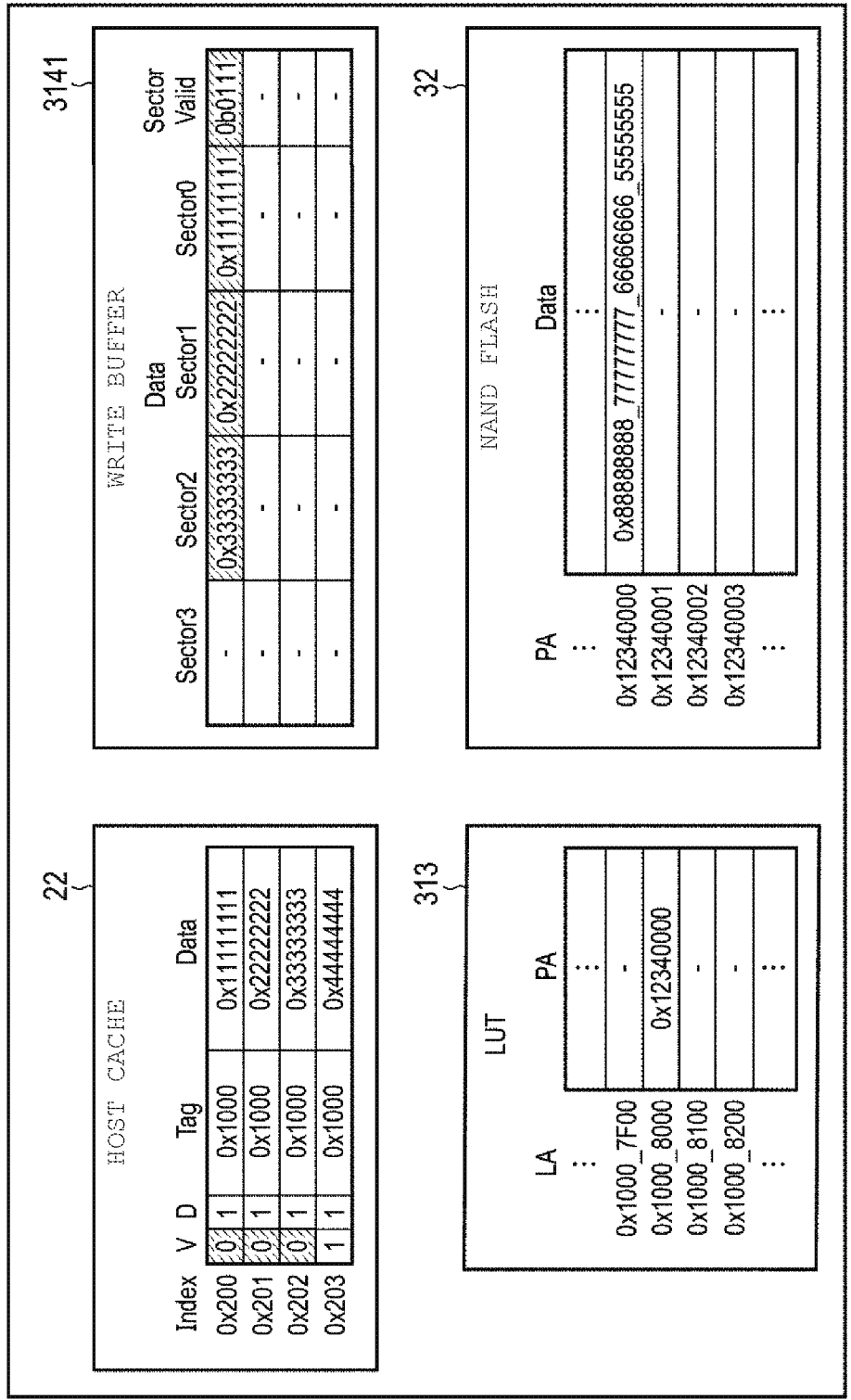
FIG. 9 is a diagram illustrating an example of a state of each of the cache, the write buffer, the lookup table, and the NAND flash memory after partial writing in the memory system.

Next, it is assumed that 192B data corresponding to LA0x1000_8000 to 0x1000_80BF is all flushed from three cache lines of the host cache 22 and is written (partially written) into the memory system 3 by cache line confliction. FIG. 9 is a diagram illustrating an example of states of the cache, the write buffer, the lookup table, and the NAND flash after partial writing in the memory system according to the first embodiment.

When the 192B data corresponding to LA0x1000_8000 to 0x1000_80BF are flushed from the host cache 22 and is written into the memory system 3, the valid bit corresponding to each three cache lines of corresponding to the indexes 0x200 to 0x202 is set to "0" indicating invalidation. Data stored in a cache line corresponding to the index 0x203, that is, data of LA0x1000_8000 to 0x1000_80FF, remains as valid and dirty data on the host cache 22.

Three 64B data provided in the 192B data, that is, "0x11111111", "0x22222222", and "0x33333333" are stored in, for example, the first entry of the write buffer 3141. In the first entry of the write buffer 3141, the first 64B data "0x11111111" is stored in the sector 0, the second 64B data "0x22222222" is stored in the sector 1, and the third 64B data "0x33333333" is stored in the sector 2. The sector 3 of the first entry is maintained as an empty state. The sector valid corresponding to the first entry is set to 0b0111.

Figure 10:
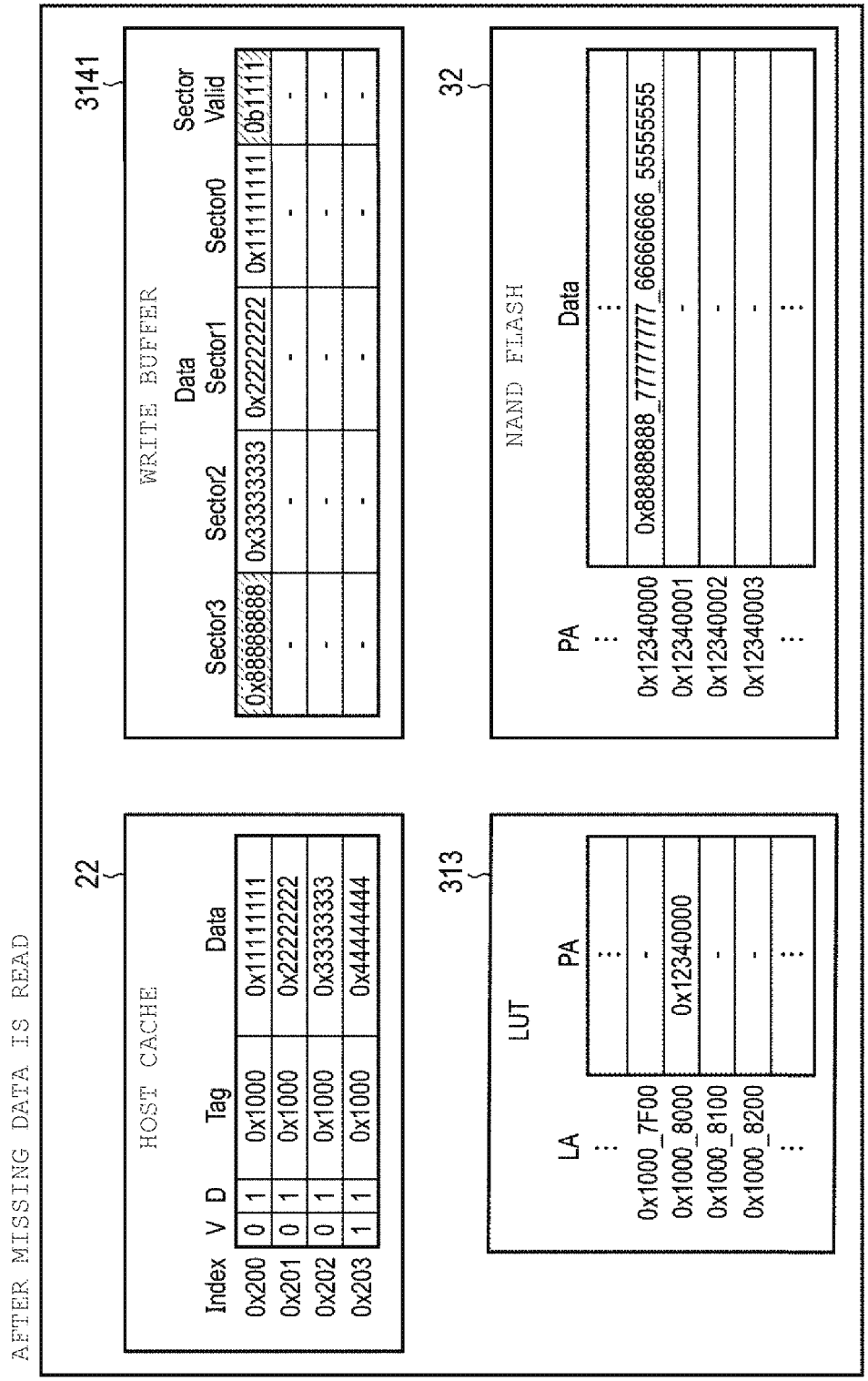
FIG. 10 is a diagram illustrating an example of a state of each of the cache, the write buffer, the lookup table, and the NAND flash memory after missing data is read from the NAND flash memory of the memory system.

Subsequently, the memory controller 31 reads missing data from the NAND flash 32. FIG. 10 is a diagram illustrating an example of states of the cache, the write buffer, the lookup table, and the NAND flash after missing data is read from the NAND flash of the memory system according to the first embodiment.

Here, the memory controller 31 selects the first entry of the write buffer 3141 as a target entry of a program operation.

When it is verified that no data is stored in the sector 3 of the target entry (first entry), the memory controller 31 identifies LA0x1000_80C0 which is the LA corresponding to the 64B data to be stored in the sector 3 as an LA corresponding to the missing data. The memory controller 31 reads the missing data corresponding to the identified LA0x1000_80C0 from the NAND flash 32 and stores the missing data in the sector 3 of the target entry. Here, the memory controller 31 reads at least 256B data ("0x88888888", "0x77777777", "0x66666666", and "0x55555555") before update corresponding to LA0x1000_8000 from the NAND flash 32. The reading is executed based on PA0x12340000 corresponding to LA0x1000_8000.

Accordingly, 0x88888888 which is the data before update is stored in the sector 3 of the target entry. Then, the sector valid is set to 0b1111.

Figure 11:
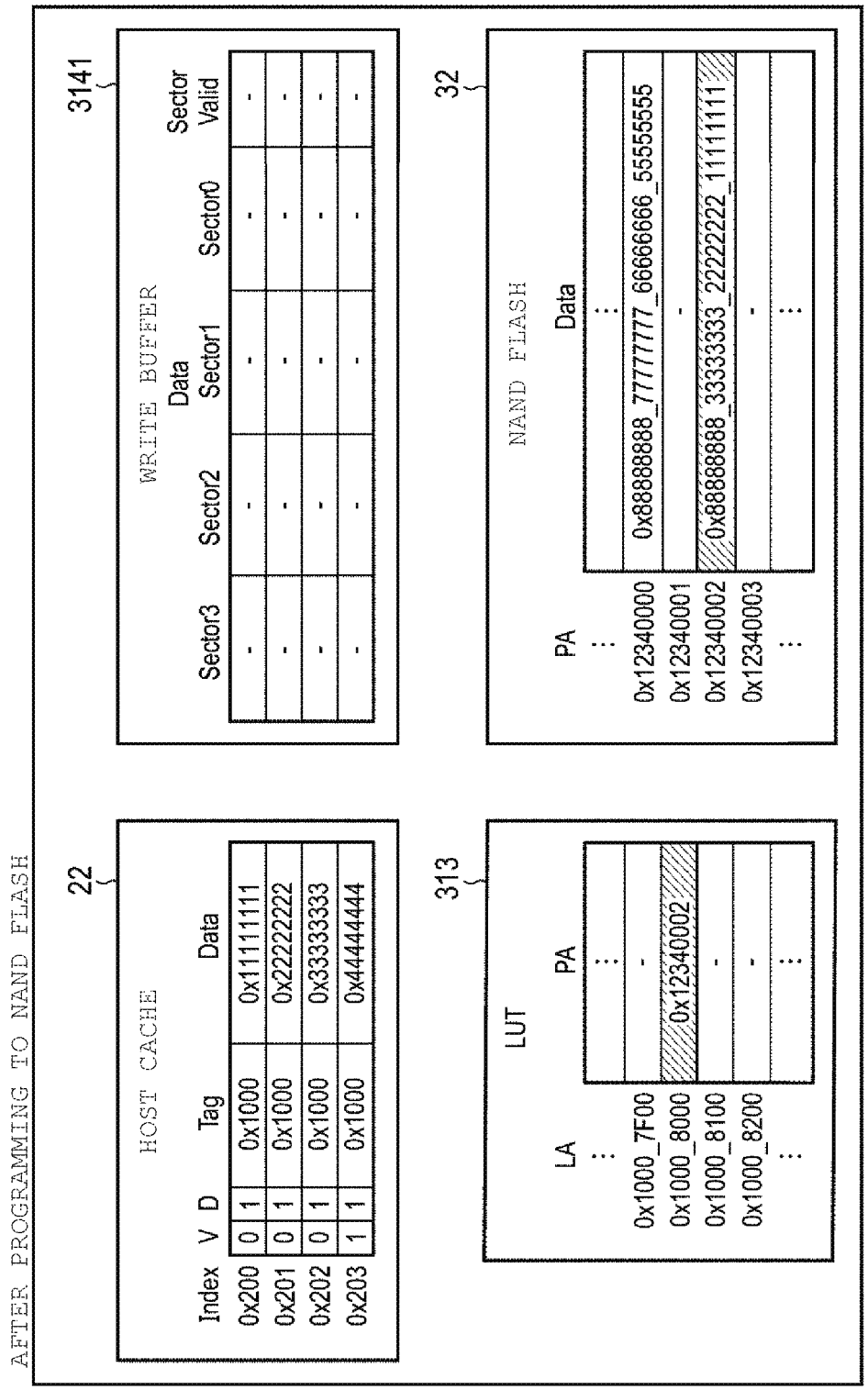
FIG. 11 is a diagram illustrating an example of a state of each of the cache, the write buffer, the lookup table, and the NAND flash memory after programming to the NAND flash memory of the memory system.

Subsequently, the memory controller 31 writes the data in the NAND flash 32. FIG. 11 is a diagram illustrating an example of states of the cache, the write buffer, the lookup table, and the NAND flash after programming to the NAND flash of the memory system according to the first embodiment.

When the data with the management size is lined up in the target entry (first entry) of the write buffer 3141, the memory controller 31 writes 256B data (0x88888888, 33333333, 22222222, and 11111111) stored in the first entry of the write buffer 3141 in a physical storage area in the NAND flash 32 which is different from the physical storage area where the 256B data (0x88888888, 77777777, 66666666, and 55555555) before correspondence to the LA range (LA0x1000_8000 to 0x1000_80FF), for example, a physical storage area in the NAND flash 32 represented by, for example, PA0x12340002. PA0x12340002 is a new physical address allocated to LA0x1000_8000 which is a head of the LA range (LA0x1000_8000 to 0x1000_80FF).

Then, the memory controller 31 updates the entry of the LUT 313 corresponding to LA0x1000_8000 and changes the PA associated with LA0x1000_8000 from PA0x12340000 to PA0x12340002. After the operation of updating the LUT 313 is executed, an operation of writing the 256B data in the NAND flash 32 may be executed.

When the 256B data is written in the NAND flash 32, the first entry of the write buffer 3141 becomes an available entry. In the physical storage area indicated by PA0x12340002 of the NAND flash 32, 256B data (0x88888888_33333333_22222222_11111111) in which the 192B data after update and the 64B data before update are mixed is stored.

Here, in the cache line corresponding to the index 0x203 of the host cache 22, 0x44444444 (also referred as to remaining data) which is the data after update is stored. The remaining data can be flushed later in response to an operation of the host 2.

Figure 12:
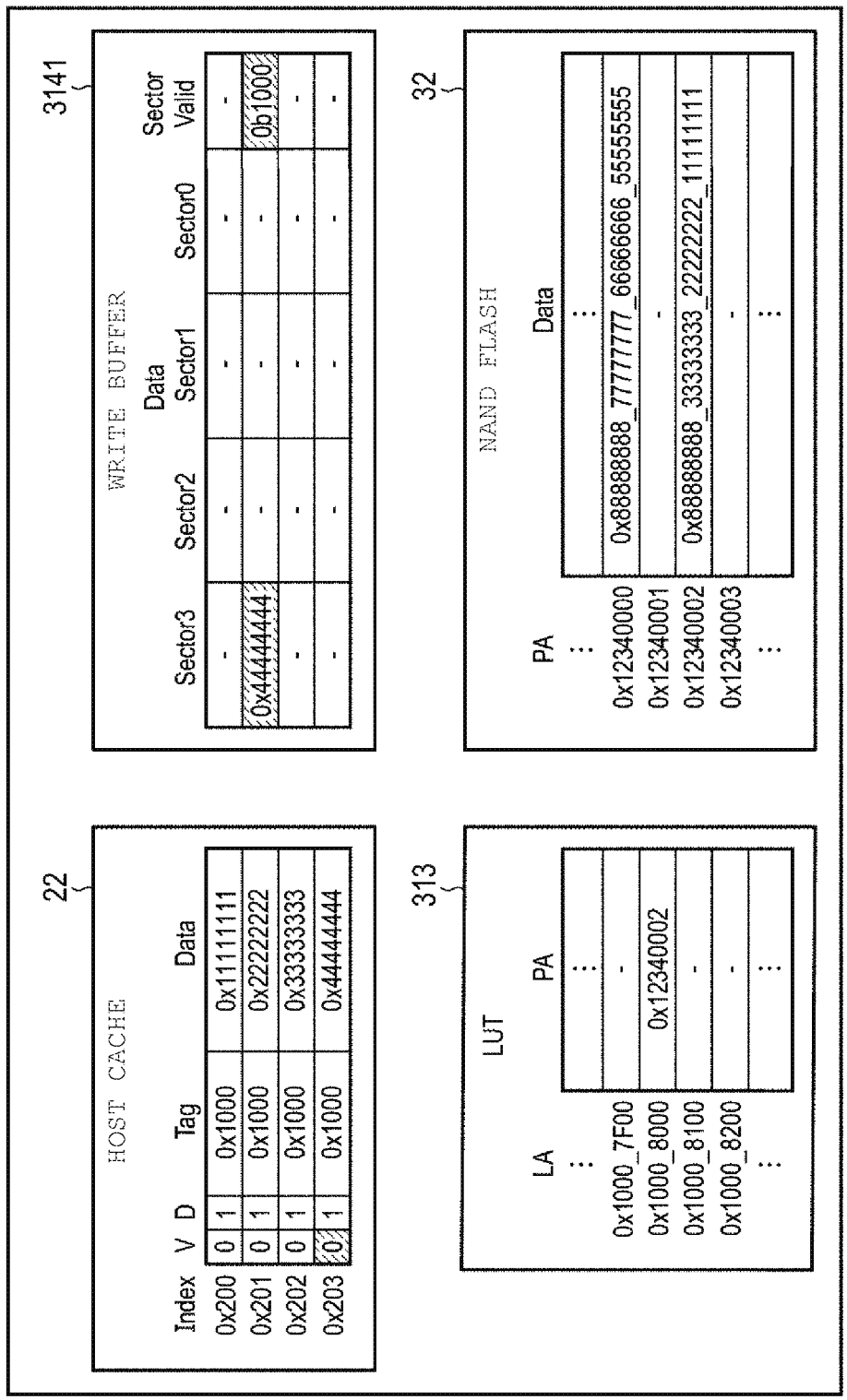
FIG. 12 is a diagram illustrating an example of a state of each of the cache, the write buffer, the lookup table, and the NAND flash memory after remaining data is written in the memory system from the cache.

When the remaining data stored in the host cache 22 is flushed, the remaining data is written in the memory system 3. FIG. 12 is a diagram illustrating an example of states of the cache, the write buffer, the lookup table, and the NAND flash after remaining data is written in the memory system according to the first embodiment from the cache.

When the 64B remaining data corresponding to LA0x1000_8000 is flushed from the host cache 22 and is written into the memory system 3, the valid bit corresponding to the cache line corresponding to the index 0x203 is set to "0" indicating invalidation. The flushed 64B data, that is, "0x44444444", is stored in the sector 3 of one entry (for example, second entry) of the write buffer 3141. Since valid data is not stored in the other sectors of the second entry, the sector valid of the second entry is set to 0b1000.

Figure 13:
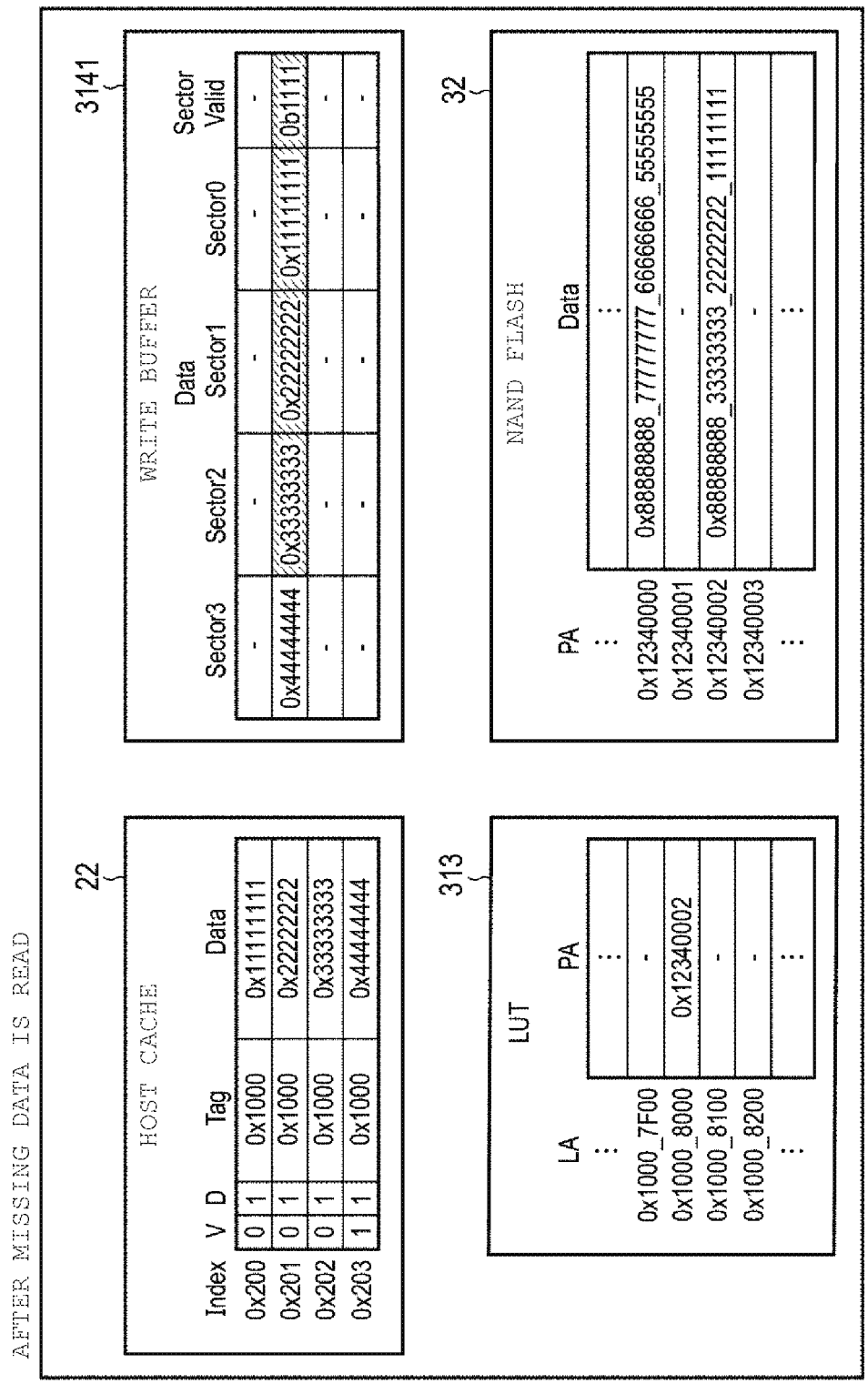
FIG. 13 is a diagram illustrating an example of a state of each of the cache, the write buffer, the lookup table, and the NAND flash memory after missing data is read from the NAND flash memory of the memory system.

Subsequently, the memory controller 31 reads missing data from the NAND flash 32. FIG. 13 is a diagram illustrating an example of states of the cache, the write buffer, the lookup table, and the NAND flash after missing data is read from the NAND flash of the memory system according to the first embodiment.

Here, it is assumed that the second entry of the write buffer 3141 is selected as a target entry of the program operation.

When it is verified that data is not stored in each of the sector 0 to the sector 2 of the target entry (second entry), the memory controller 31 identifies LA0x1000_8000, LA0x1000_8040, and LA0x1000_8080 as the LAs corresponding to each of three pieces of missing data. The memory controller 31 reads three pieces of 64B data corresponding to the identified LA0x1000_8000, LA0x1000_8040, and LA0x1000_8080 from the NAND flash 32 and stores the three pieces of 64B data in the sectors 0, 1, and 2 of the target entry, respectively. Here, the memory controller 31 reads at least 256B data ("0x88888888", "0x33333333", "0x22222222", and "0x11111111") corresponding LA0x1000_8000 from the NAND flash 32. The data are data written in the NAND flash 32 in the first program operation. The data are read based on PA0x12340002 corresponding to LA0x1000_8000.

Accordingly, data 0x11111111 is stored in the sector 0 of the target entry, data 0x22222222 is stored in the sector 1 of the target entry, and data 0x33333333 is stored in the sector 2 of the target entry. The sector valid of the target entry is set to 0b1111.

Figure 14:
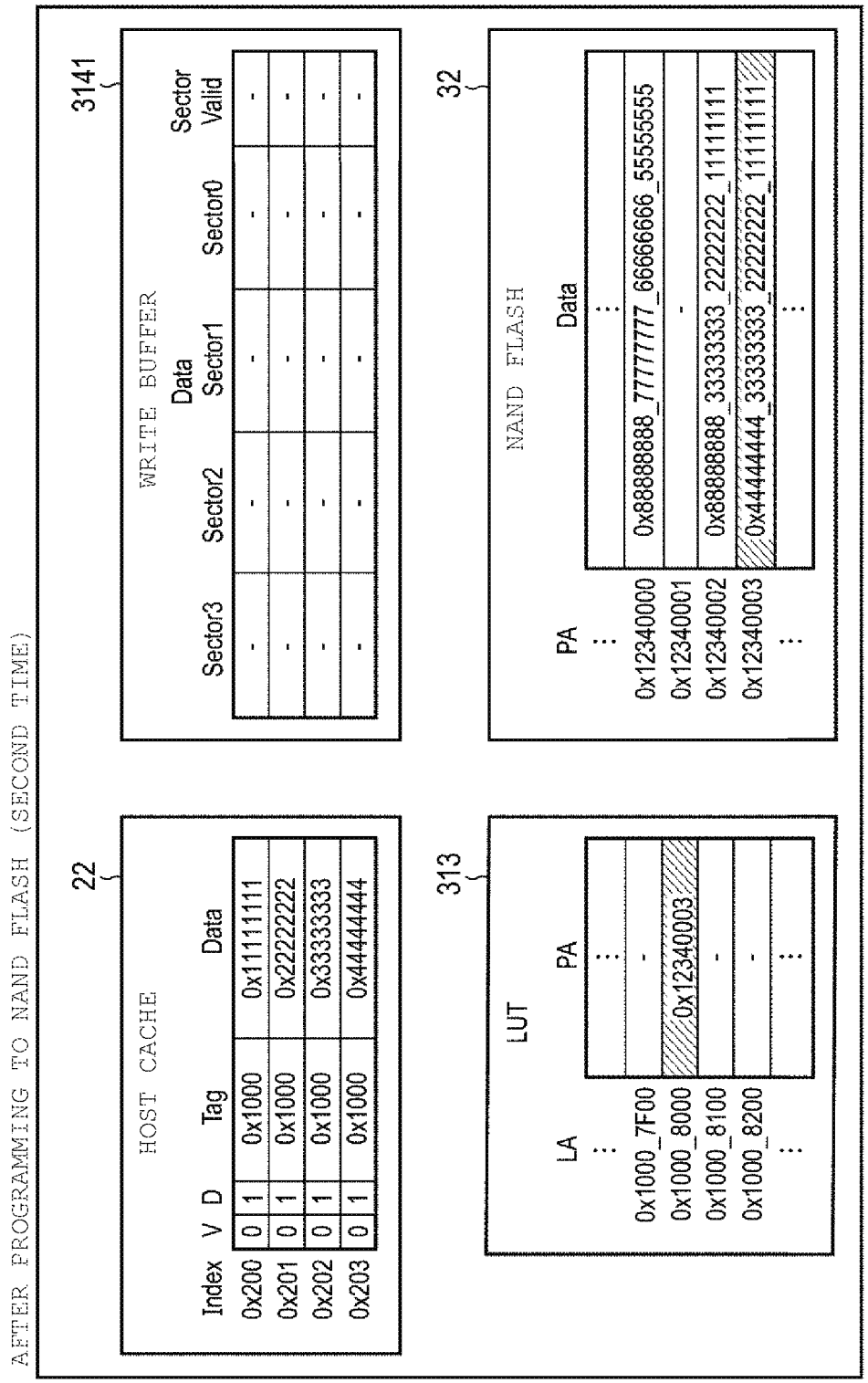
FIG. 14 is a diagram illustrating an example of a state of each of the cache, the write buffer, the lookup table, and the NAND flash memory after second-time programming to the NAND flash memory of the memory system.

Subsequently, the memory controller 31 writes data in the NAND flash 32. FIG. 14 is a diagram illustrating an example of states of the cache, the write buffer, the lookup table, and the NAND flash after second-time programming to the NAND flash of the memory system according to the first embodiment.

When data with the management size is lined up in the target entry (second entry) of the write buffer 3141, the memory controller 31 writes 256B data (0x44444444, 33333333, 22222222, and 11111111) stored in the second entry of the write buffer 3141 in another physical storage area in the NAND flash 32 different from the physical storage area in which the remaining 256B data (0x88888888, 33333333, 22222222, and 11111111) is written, for example, a physical storage area in the NAND flash 32 indicated by PA0x12340003.

Then, the memory controller 31 updates the entry of the LUT 313 corresponding to LA0x1000_8000 again and changes the PA associated with LA0x1000_8000 from PA0x12340002 to PA0x12340003. After the operation of updating the LUT 313 is executed, an operation of writing the 256B data in the NAND flash 32 may be executed.

As such, when the data stored in the host cache 22 is partially flushed, a read operation for missing data is executed twice in the NAND flash 32 and a program operation is executed twice in the NAND flash 32. The overhead degrades performance of the memory system 3. For example, an increase in the number of reads is a cause of reducing a throughput of the NAND flash 32 and an increase in the number of programs is a cause of degrading durability of the NAND flash 32.

Controlling flush from the host cache 22 at an appropriate timing is not realistic because of the following reasons.

Updating of data on the host cache 22 and flushing of data from the host cache 22 are executed at different timings. This is because the updating of the data on the host cache 22 is caused by data writing by an application executed on the host 2, and the flushing is caused by confliction of cache lines. The confliction of cache lines is caused not only by an application updating data but also by another application. When the host cache 22 is shared by a plurality of CPUs, confliction of cache lines may also be caused by another application executed by each of different CPUs.

A method of controlling flushing from the host cache 22 by issuing a cache flush command at an appropriate timing by an application executed on the host 2 (issuing a cache flush command for each writing of 256B) can also be used. However, the management size of the LUT 313 which is the unit of logical-to-physical address conversion is assumed to be different for each memory expansion device. Actually, it is difficult to correct all applications so that a cache flush command is issued at an appropriate timing.

Accordingly, the memory system 3 reduces an overhead by executing an operation of requesting missing data to the host cache 22 when data with the management size is not stored in the target entry.

Figure 15:
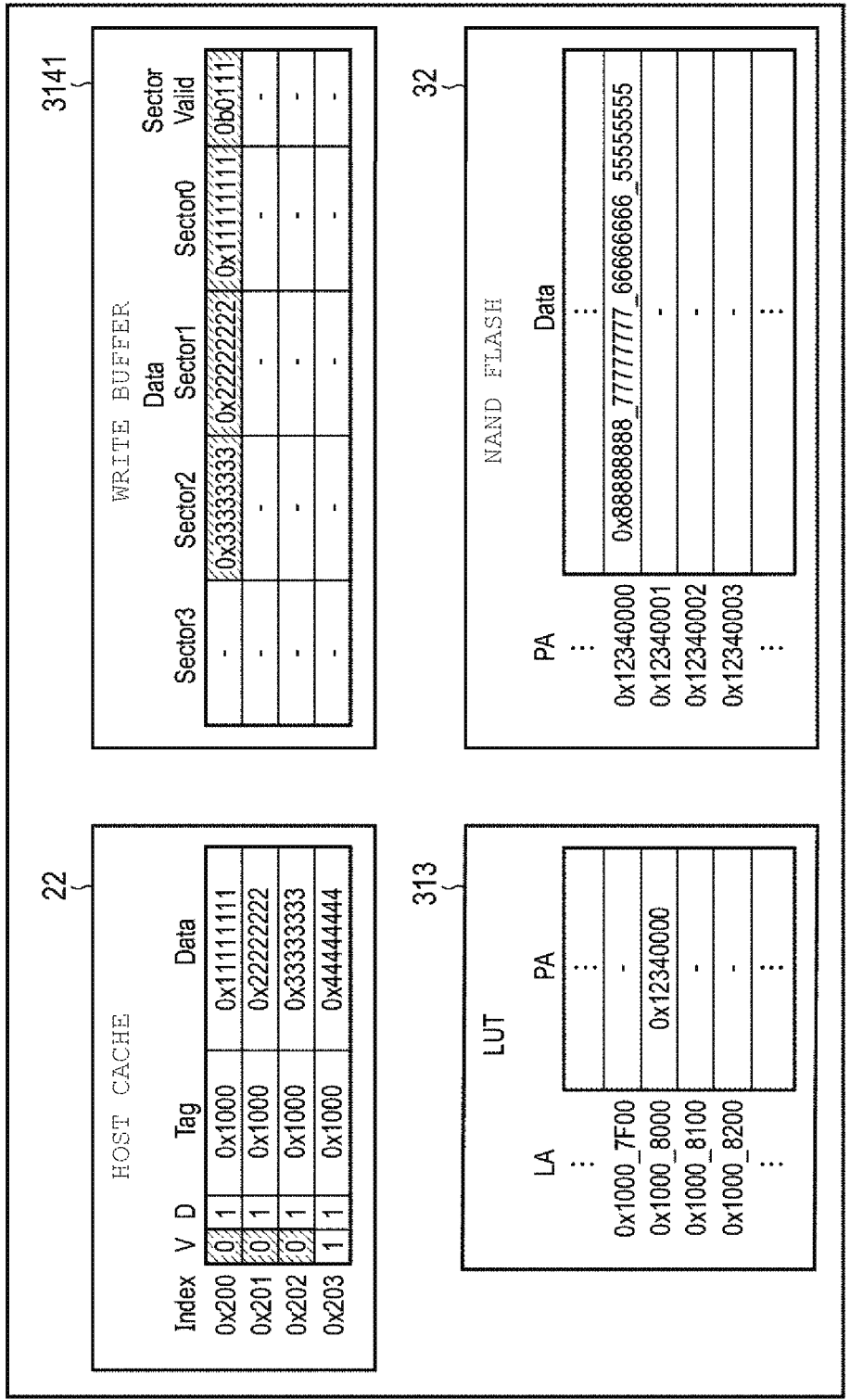
FIG. 15 is a diagram illustrating an example of a state of each of the cache, the write buffer, the lookup table, and the NAND flash memory after partial writing in the memory system.

Subsequently, a write process involving a request for missing data will be described. FIG. 15 is a diagram illustrating an example of states of the cache, the write buffer, the lookup table, and the NAND flash after partial writing in the memory system according to the first embodiment.

A state of each of the host cache 22, the write buffer 3141, the LUT 313, and the NAND flash 32 illustrated in FIG. 15 is the same as the state of each of the host cache 22, the write buffer 3141, the LUT 313, and the NAND flash 32 illustrated in FIG. 9.

Figure 16:
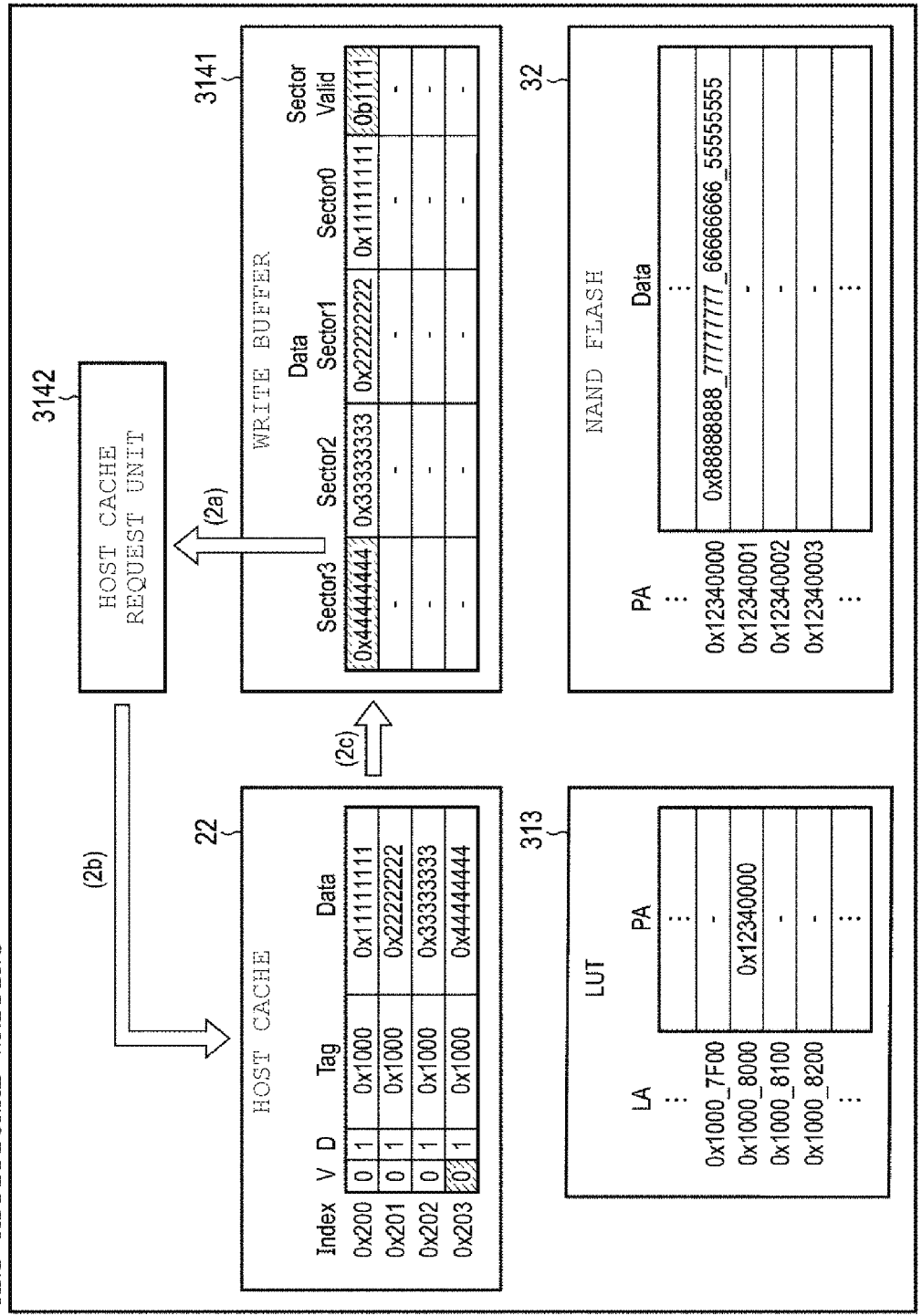
FIG. 16 is a diagram illustrating an example of a state of each of the cache, the write buffer, the lookup table, and the NAND flash memory after additional writing and a request to the cache executed in the memory system.

Subsequently, the memory controller 31 executes a write operation and transmits an inquiry for the missing data. FIG. 16 is a diagram illustrating an example of states of the cache, the write buffer, the lookup table, and the NAND flash after additional writing and an inquiry to the cache executed in the memory system according to the first embodiment.

First, the memory controller 31 selects the first entry of the write buffer 3141 as a target entry of the program operation in which data to be written into the NAND flash 32 is stored.

When it is verified that valid data is not stored in the sector 3 of the target entry (first entry), the memory controller 31 identifies the LA (here, LA0x1000_80C0) corresponding to the missing data to be stored in the sector 3 and notifies the host cache request unit 3142 of the identified LA0x1000_80C0 (2a).

The host cache request unit 3142 requests the host 2 to transmit the missing data from the host cache 22 to the memory system 3 by transmitting an inquiry, which is a request for designating LA0x1000_8000 to the host 2 (2b). Here, the host cache request unit 3142 transmits, for example, CXL.cache CLFlush for designating 0x1000_80C0 as the inquiry to the host 2. The host cache 22 receiving the inquiry determines whether data corresponding to LA0x1000_8000 is stored in the host cache 22.

When the data corresponding to the designated LA0x1000_8000 is stored in the host cache 22, the host 2 transmits the data corresponding to the designated LA0x1000_80C0 from the host cache 22 to the memory system 3 (2c). The data corresponding to LA0x1000_8000 is stored in a cache line corresponding to the index 0x203. Therefore, the data stored in the cache line corresponding to the index 0x203 is transmitted to the memory system 3. The memory controller 31 the data corresponding to stores to LA0x1000_8000 transmitted from the host cache 22 in the sector 3 of the first entry of the write buffer 3141. The valid bit of the cache line corresponding to the index 0x203 of the host cache 22 is set to 0. The sector valid of the first entry of the write buffer 3141 is set to 0b1111.

Accordingly, the data of the management size is lined up in the first entry of the write buffer 3141. Subsequently, the memory controller 31 can execute the same operation as the program operation to the NAND flash 32 described in FIG. 8.

FIG. 16 illustrates a case where the inquiry transmitted by the host cache request unit 3142 is CXL.cache CLFlush. Therefore, data corresponding to the LA designated by CXL.cache CLFlush is flushed. That is, the data corresponding to the LA designated by CXL.cache CLFlush is written back to the memory system 3 and is invalidated. Accordingly, the valid bit corresponding to the cache line corresponding to the index 0x203 in which the data corresponding to the LA designated by CXL.cache CLFlush is stored is set to 0.

Figure 17:
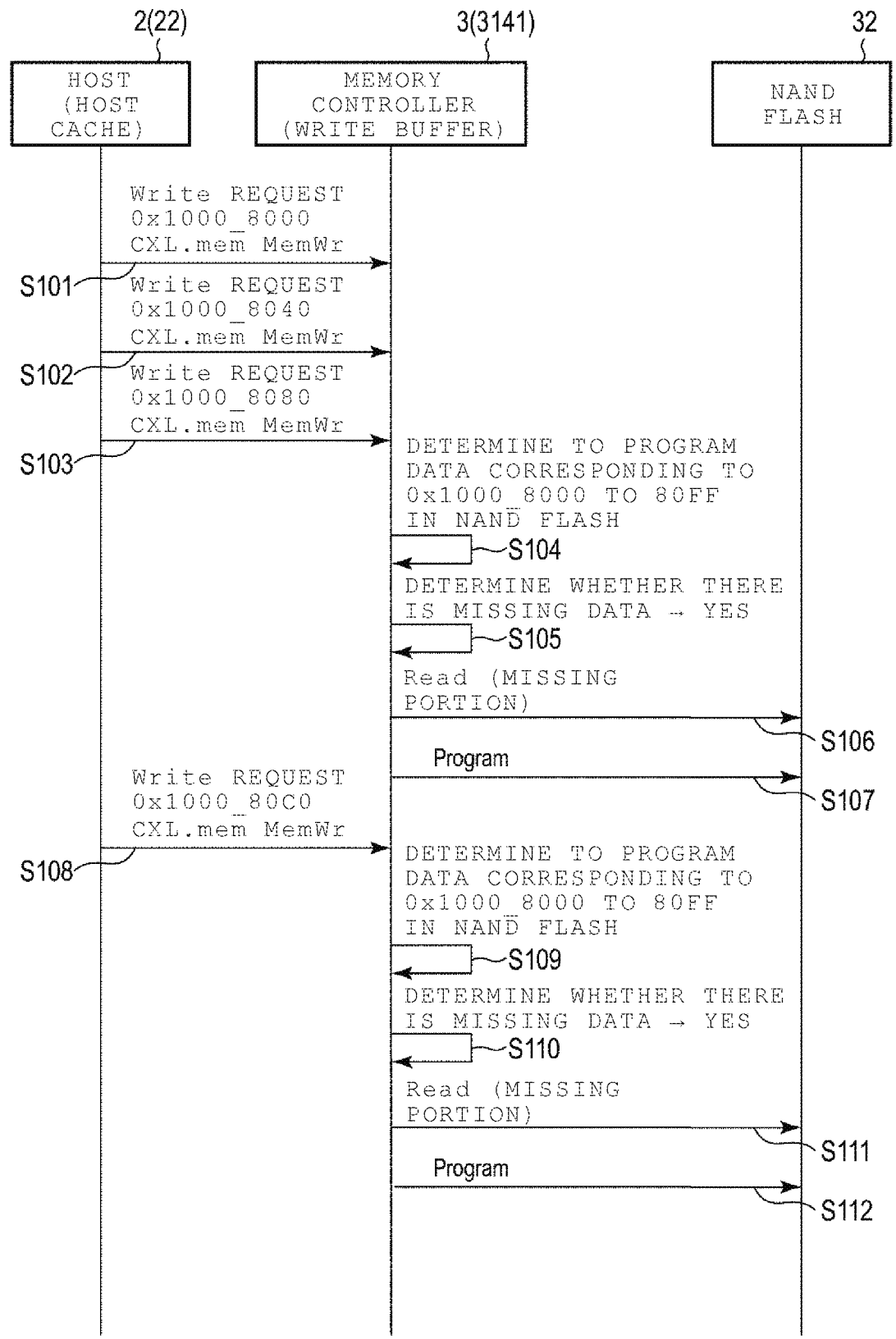
FIG. 17 is a sequence diagram illustrating a procedure of a process executed in the memory system when an inquiry to the cache is not performed.

Next, a procedure of a write process when the memory controller 31 does not give a request to the host cache 22 will be described. FIG. 17 is a sequence diagram illustrating a procedure of a process executed in the memory system according to the first embodiment when the inquiry to the host is not used.

First, the host 2 transmits a write request for designating 0x1000_8000 to the memory controller 31 (step S101). The write request transmitted here is, for example, CXL.mem MemWr defined according to the CXL standard. CXL.mem MemWr is a write access request for giving a request for writing 64B data at an address (here, 0x1000_8000) designated by CXL.mem MemWr. The memory controller 31 that received the write request (CXL.mem MemWr) stores the 64B data received together with the write request in one entry among a plurality of entries of the write buffer 3141.

The host 2 transmits a write request (CXL.mem MemWr) for designating 0x1000_8040 to the memory controller 31 (step S102). 0x1000_8040 belongs to the same 256B LA range (0x1000_8000 to 0x1000_80FF) as 0x1000_8000 designated by CXL.mem MemWr received in step S101. Therefore, the memory controller 31 that received CXL.mem MemWr by which 0x1000_8040 is designated stores the 64B data received together with CXL.mem MemWr in step S102 in the same entry as the entry of the write buffer 3141 in which the 64B data received in step S101 is stored.

The host 2 transmits the write request (CXL.mem MemWr) by which 0x1000_8080 is designated to the memory controller 31 (step S103). 0x1000_8080 also belongs to the same 256B LA range (0x1000_8000 to 0x1000_80FF) as 0x1000_8000 designated by CXL.mem MemWr received in step S101. Therefore, the memory controller 31 that received CXL.mem MemWr by which 0x1000_8080 is designated stores the 64B data received together with CXL.mem MemWr in step S103 in the same entry as the entry of the write buffer 3141 in which the 64B data received in step S101 is stored.

Subsequently, the memory controller 31 determines to program the data stored in a certain entry of the write buffer 3141 (here, 256B data corresponding to 0x1000_8000 to 0x1000_80FF) in the NAND flash 32 (step S104).

The memory controller 31 determines whether there is missing data (step S105). That is, the memory controller 31 determines whether all data corresponding to 0x1000_8000 to 0x1000_80FF is stored in the write buffer 3141. Here, the 64B data corresponding to 0x1000_8000 is not stored in the write buffer 3141. Accordingly, the memory controller 31 identifies 0x1000_8000 as the LA corresponding to the missing data.

The memory controller 31 reads the missing data from the NAND flash 32 based on the PA allocated to the LA corresponding to the missing data (step S106). The memory controller 31 stores the read missing data in the write buffer 3141. Accordingly, the 256B data corresponding to 0x1000_8000 to 0x1000_80FF in which the data is determined to be programmed in step S104 is all lined up on the write buffer 3141.

The memory controller 31 writes the 256B data corresponding to 0x1000_8000 to 0x1000_80FF in the NAND flash 32 (step S107).

Thereafter, the host 2 transmits a write request (CXL.mem MemWr) by which 0x1000_80C0 is designated to the memory controller 31 (step S108). The write request transmitted in step S108 designates 0x1000_80C0. The memory controller 31 that received the write request stores the data received together with the write request in one entry among the plurality of entries of the write buffer 3141.

Subsequently, the memory controller 31 determines to program data stored in a certain entry of the write buffer 3141 (here, 256B data corresponding to 0x1000_8000 to 0x1000_80FF) in the NAND flash 32 (step S109).

The memory controller 31 determines whether there is missing data (step S110). That is, the memory controller 31 determines whether all data corresponding to 0x1000_8000 to 0x1000_80FF is stored in the write buffer 3141. Here, 192B data corresponding to 0x1000_8000 to 0x1000_80BF is not stored in the write buffer 3141. Accordingly, the memory controller 31 determines that the 192B data corresponding to 0x1000_8000 to 0x1000_80BF is missing data.

The memory controller 31 reads the missing data from the NAND flash 32 (step S111). The memory controller 31 stores the read missing data in the write buffer 3141. Accordingly, the 256B data corresponding to 0x1000_8000 to 0x1000_80FF in which the data is determined to be programmed in step S109 is all lined up on the write buffer 3141.

The memory controller 31 writes the 256B data corresponding to 0x1000_8000 to 0x1000_80FF in the NAND flash 32 (step S112).

Figure 18:
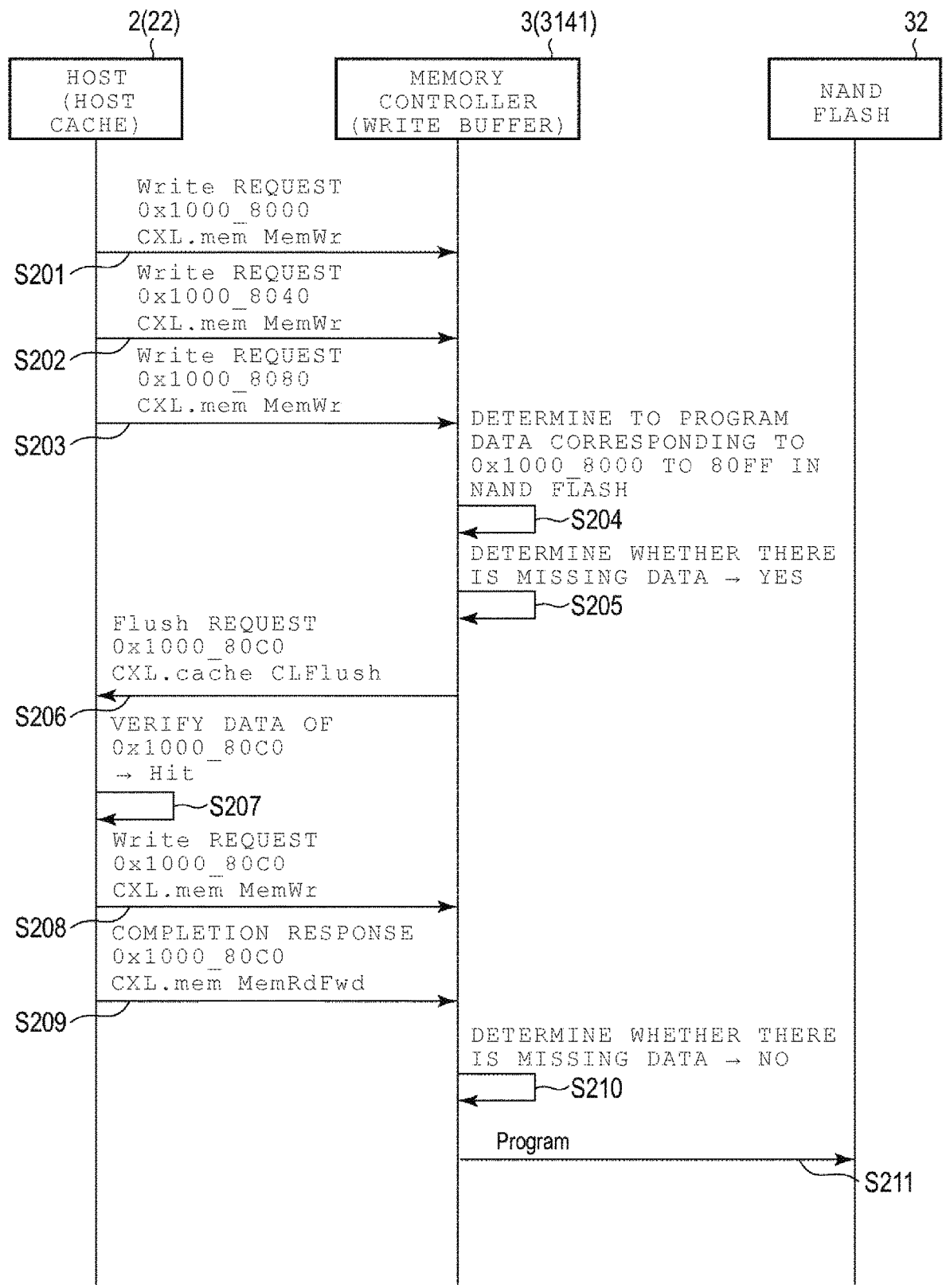
FIG. 18 is a sequence diagram illustrating a procedure of a process executed in the memory system when missing data is stored in the cache.

Next, a write process involving a request to the host 2 will be described. Here, it is assumed that missing data is stored in the host cache 22. FIG. 18 is a sequence diagram illustrating a procedure of a process executed in the memory system according to the first embodiment when missing data is stored in the cache.

The host 2 and the memory controller 31 execute operations similar to steps S101 to S105 (steps S201 to S205). In step S205, the memory controller 31 identifies the LA (here, 0x1000_80C0) corresponding to the missing data.

The memory controller 31 requests the host 2 to transmit the data corresponding to the designated LA from the host cache 22 to the memory system 3 by transmitting a request for accessing the host cache 22 and designating the LA (here, 0x1000_80C0) corresponding to the missing data to the host 2 (step S206). The request transmitted here is, for example, CXL.cache CLFlush.

In response to reception of the request, the host 2 determines whether the data corresponding to 0x1000_80C0 designated by the received request is stored in the host cache 22 (step S207). Here, a case where the data corresponding to the designated 0x1000_8000 is stored in the host cache 22 will be described.

The host 2 transmits a write request for writing the data corresponding to 0x1000_8000 to the memory controller 31 (step S208). The write request transmitted here is, for example, CXL.mem MemWr. 0x1000_80C0 is designated by CXL.mem MemWr. The host 2 transmits the missing data (that is, 64B data corresponding to 0x1000_80C0) to the memory controller 31 together with the write request (CXL.mem MemWr).

Then, the host 2 transmits a completion response, which is a response indicating that the process for the request received in step S206 is completed, to the memory controller 31 (step S209). The completion response is, for example, CXLL.mem MemRdFwd defined according to the CXL standard.

The memory controller 31 determines whether there is missing data in the 256B data determined to be programmed in step S204 (step S210). By the data received together with the write request in step S208, the 256B data corresponding to 0x1000_8000 to 0x1000_80FF is all lined up on the write buffer 3141. Therefore, the memory controller 31 determines that there is not missing data.

The memory controller 31 writes the 256B data determined to be programmed in step S204 in the NAND flash 32 (step S211). In step S211, the memory controller 31 writes the 256B data corresponding to 0x1000_8000 to 0x1000_80FF in a physical storage area in the NAND flash 32 indicated by the PA allocated to 0x1000_8000.

Figure 19:
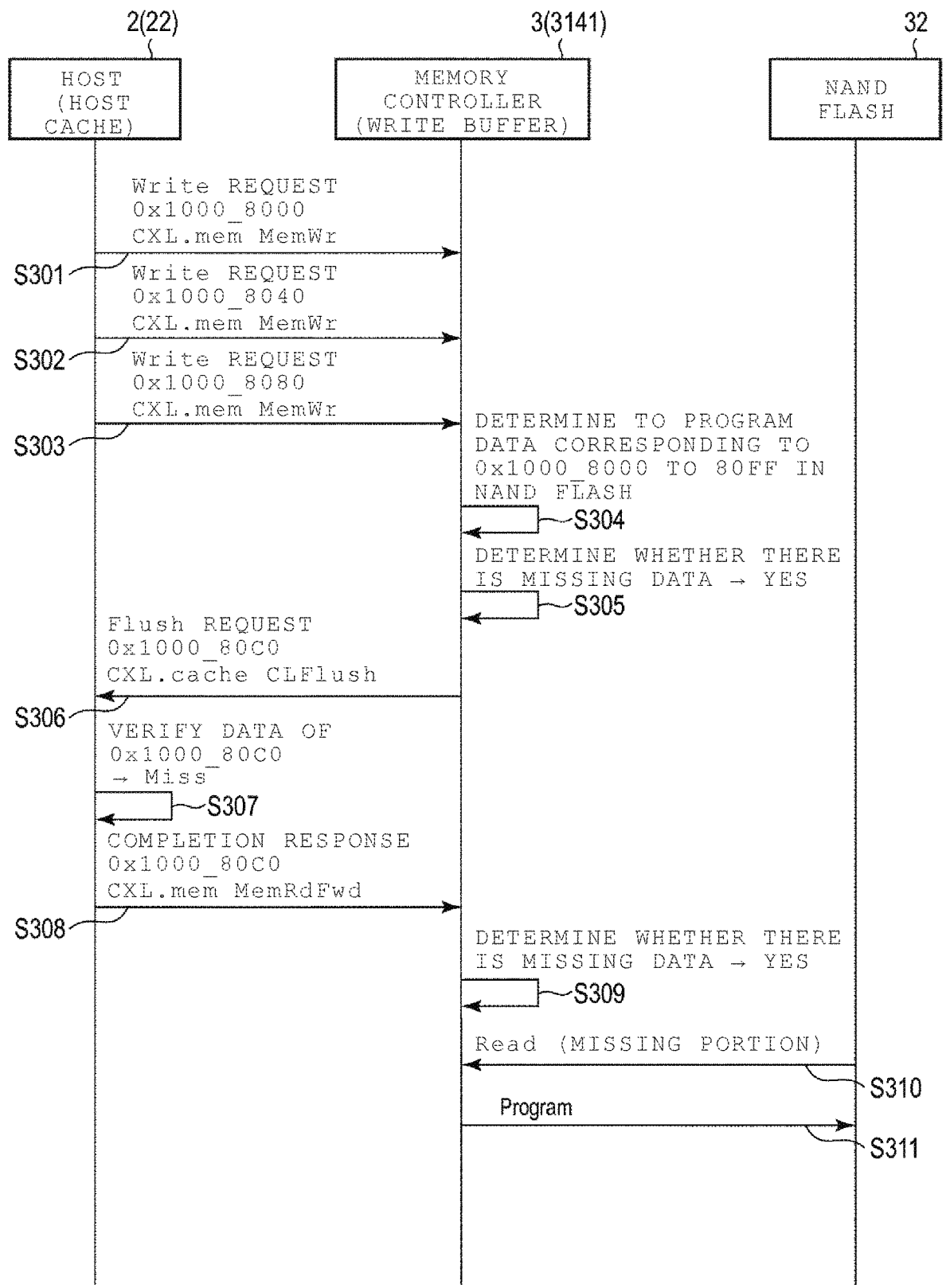
FIG. 19 is a sequence diagram illustrating a procedure of a process executed in the memory system when the missing data is not stored in the cache.

Next, a write process when the missing data is not stored in the host cache 22 will be described. FIG. 19 is a sequence diagram illustrating a procedure of a process executed in the memory system according to the first embodiment when the missing data is not stored in the cache.

The host 2 and the memory controller 31 execute operations similar to steps S101 to S105 (steps S301 to S305). In step S305, the memory controller 31 identifies the LA (here, 0x1000_80C0) corresponding to the missing data.

The memory controller 31 requests the host 2 to transmit the data corresponding to the designated LA from the host cache 22 to the memory system 3 by transmitting a request for accessing the host cache 22 and designating the LA (here, 0x1000_80C0) corresponding to the missing data to the host 2 (step S306). The request transmitted here is, for example, CXL.cache CLFlush.

In response to reception of the request, the host 2 determines whether the data corresponding to 0x1000_80C0 designated by the received request is stored in the host cache 22 (step S307). Here, a case where the data corresponding to the designated 0x1000_8000 is not stored in the host cache 22 will be described.

The host 2 does not transmit the write request (CXL.mem MemWr) to the memory system 3 and transmits a completion response, which is a response indicating completion of the process for the request received in step S306, to the memory controller 31 (step S308). The completion response is, for example, CXLL.mem MemRdFwd defined according to the CXL standard. The memory controller 31 recognizes that the missing data is not stored in the host cache 22 by receiving the completion response without receiving the write request (CXL.mem MemWr) for designating the LA of the missing data.

The memory controller 31 determines whether there is missing data in the 256B data determined to be programmed in step S304 (step S309). The memory controller 31 has not received the data corresponding to the LA designated by the request transmitted in step S306 from the host 2. Therefore, since the 256B data corresponding to 0x1000_8000 to 0x1000_80FF is not lined up on the write buffer 3141, the memory controller 31 determines that there is missing data.

The memory controller 31 reads the missing data from the NAND flash 32 (step S310). Here, the memory controller 31 reads the data corresponding to 0x1000_80C0 from the NAND flash 32 and stores the data in the write buffer 3141. Accordingly, the 256B data determined in step S304 is all lined up on the write buffer 3141.

The memory controller 31 writes the 256B data determined to be programmed in step S304 in the NAND flash 32 (step S311). In step S311, the memory controller 31 writes the 256B data corresponding to 0x1000_8000 to 0x1000_80FF into a physical storage area in the NAND flash 32 indicated by the PA allocated to 0x1000_8000.

Figure 20:
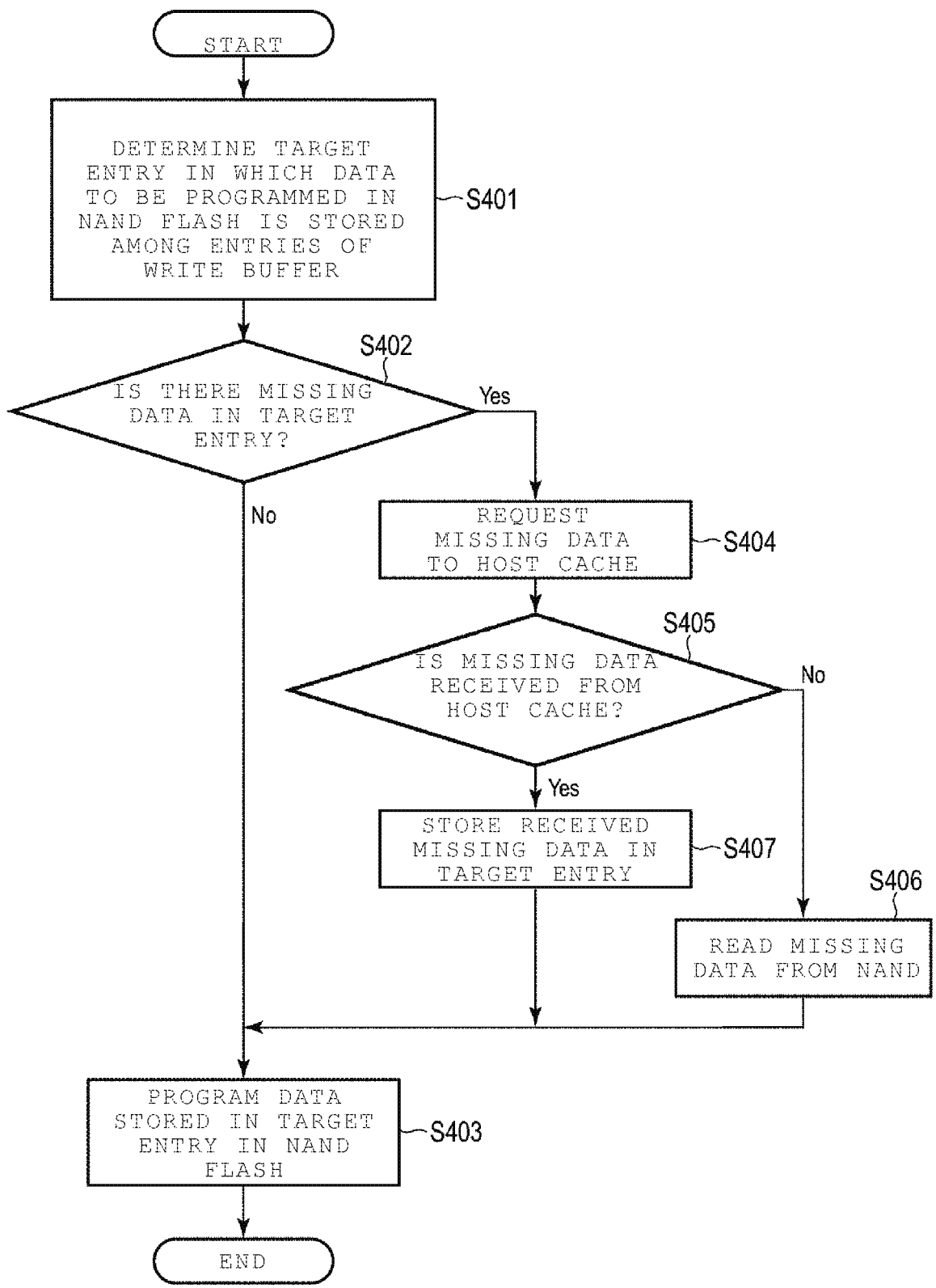
FIG. 20 is a flowchart illustrating an example of a procedure of a write process executed in the memory system.

Next, a procedure of the write process will be described. FIG. 20 is a flowchart illustrating an example of a procedure of a write process executed in the memory system according to the first embodiment.

First, the memory controller 31 determines a target entry in which data to be programmed in the NAND flash 32 is stored among a plurality of entries of the write buffer 3141 (step S401). As a method of determining the target entry, for example, a method such as selecting an entry of which write time is the oldest when the number of available entries of the write buffer is less than a specific threshold is conceivable. However, the embodiment is not particularly limited thereto.

The memory controller 31 determines whether there is missing data in the target entry determined in step S401 (step S402).

When there is no missing data in the target entry (No in step S402), the memory controller 31 programs the data stored in the target entry in the NAND flash 32 (step S403).

When there is missing data in the target entry (Yes in step S402), the memory controller 31 requests the missing data to the host cache 22 (step S404). Here, the memory controller 31 requests the host 2 to transmit the missing data from the host cache 22 to the memory system 3 by transmitting a request for designating the LA corresponding to the missing data to the host 2.

The memory controller 31 determines whether the missing data is received from the host cache 22 (step S405). In other words, when the missing data is stored in the host cache 22, the memory controller 31 can receive the missing data stored in the host cache 22 from the host 2. When the missing data is not stored in the host cache 22, the memory controller 31 cannot receive the missing data from the host 2. Here, the memory controller 31 receives a completion response from the host 2 before the missing data is received from the host 2.

When the missing data is not received from the host cache 22 (No in step S405), the memory controller 31 reads the missing data from the NAND flash 32 (step S406). The memory controller 31 stores the read missing data in the target entry. Accordingly, there is no longer missing data in the target entry.

Then, the memory controller 31 programs the data stored in the target entry in the NAND flash 32 (step S403).

When the missing data is received from the host cache 22 (Yes in step S405), the memory controller 31 stores the received missing data in the target entry (step S407). Accordingly, there is no missing data in the target entry.

Then, the memory controller 31 programs the data stored in the target entry in the NAND flash 32 (step S403).

As described above, in the memory system 3 according to the first embodiment, the operation of requesting the missing data to the host 2 is executed in the write process. When the missing data is stored in the host cache 22, the memory controller 31 executes the program operation in the NAND flash 32 using the missing data transmitted from the host cache 22. Accordingly, the memory controller 31 can acquire the missing data without a read operation in the NAND flash 32. Accordingly, the memory system 3 can handle the missing data occurring in fine grained access from the host 2.

However, when the missing data is not stored in the host cache 22, the request to the host cache 22 becomes an overhead, and thus a bandwidth of an interface between the host 2 and the memory system 3 may be used wastefully. Therefore, it is desirable to execute a request to the host cache 22 efficiently. Hereinafter, examples of several configurations for executing a request to the host cache 22 efficiently will be described as second to fifth embodiments.

Second Embodiment

The memory controller 31 of the memory system 3 according to a second embodiment determines whether to request missing data to the host 2 with reference to a ratio of the missing data in a write process.

Next, a case where the ratio of the missing data to program target data is referred to in a host inquiry will be described. FIG. 21 is a diagram illustrating an example of a state of a write buffer in the memory system according to the second embodiment.

The memory controller 31 of the memory system 3 according to the second embodiment refers to a missing data ratio in the target entry of the write buffer 3141 in a write process. The missing data ratio is a ratio of missing data to data stored in one entry. Here, it is assumed that granularity of the access from the host 2 to the memory system 3 is 64B, a total size of data stored in one entry is 256B, and a size of data stored in each sector in the entry is 64B.

In the first entry of the write buffer 3141, valid data is not stored in the sector 0, data 0x33333333 is stored in the sector 1, data 0x22222222 is stored in the sector 2, and data 0x11111111 is stored in the sector 3. A sector valid of the first entry is set to 0b1110. The missing data is data to be stored in the sector 0. Therefore, a total size of the missing data is 64B. Accordingly, a missing data ratio of the first entry is 25% (=64B/256B).

In the second entry of the write buffer 3141, data 0x55555555 is stored in the sector 0, valid data is not stored in the sector 1, data 0x44444444 is stored in the sector 2, and valid data is not stored in the sector 3. A sector valid of the second entry is set to 0b0101. The missing data is data to be stored in the sector 1 and data to be stored in the sector 3. Therefore, a total size of the missing data is 128B. Accordingly, a missing data ratio of the second entry is 50% (=128B/256B).

In the third entry of the write buffer 3141, 0x66666666 is stored in the sector 0 and valid data is not stored in the sectors 1, 2, and 3. A sector valid of the third entry is set to 0b0001. The missing data is data to be stored in the sectors 1, 2, and 3. Therefore, a total size of the missing data is 192B. Accordingly, a missing data ratio of the third entry is 75% (=192B/256B).

Here, it is assumed that the first entry is selected as a target entry of a write process involving a host inquiry. The memory controller 31 transmits a request for designating the LA corresponding to data to be stored in the sector 0 to the host 2.

When the data to be stored in the sector 0 is stored in the host cache 22, the memory controller 31 can receive missing data to be stored in the sector 0 from the host 2. The memory controller 31 stores the missing data received from the host 2 in the sector 0. Then, the memory controller 31 writes the 256B data stored in the first entry in the NAND flash 32. Accordingly, the memory controller 31 can complete the write process without reading the missing data from the NAND flash 32.

Conversely, when the missing data is not stored in the host cache 22, the memory controller 31 cannot receive the missing data from the host 2. Therefore, the memory controller 31 need to read the data to be stored in the sector 0 from the NAND flash 32. Then, the memory controller 31 stores the read missing data in the sector 0. The memory controller 31 writes the data stored in the first entry in the NAND flash 32.

It is assumed that the second entry is selected as a target entry of a write process involving a host inquiry. Since granularity of access between the host 2 and the memory system 3 is 64B, the memory controller 31 transmits a first request for designating the LA corresponding to data to be stored in the sector 1 and a second request for designating the LA corresponding to data to be stored in the sector 3 to the host 2.

When both the data to be stored in the sector 1 and the data to be stored in the sector 3 are stored in the host cache 22, the memory controller 31 stores the missing data received from the host 2 in the sectors 1 and 3, respectively. Then, the memory controller 31 writes the 256B data stored in the second entry in the NAND flash 32. Accordingly, the memory controller 31 can complete the write process without reading data from the NAND flash 32.

On the other hand, when at least one of the data to be stored in the sector 1 of the second entry and the data to be stored in the sector 3 is not stored in the host cache 22, the memory controller 31 cannot line up the 256B data to be stored in the second entry by receiving the missing data from the host 2 by the host inquiry. Therefore, the memory controller 31 reads the missing data not stored in the host cache 22 from the NAND flash 32 and stores the missing data in the second entry. As such, when at least part of the missing data is not stored on the host cache 22, it is necessary for the memory controller 31 to read the missing data from the NAND flash 32. Here, when the missing data is read from the NAND flash 32, the data is read from the NAND flash 32 in units of a size of 256B or more. Therefore, it is possible to read all the missing data from the NAND flash 32 at the same time. Therefore, when part of the missing data is not stored on the host cache 22, a time taken in the write process increases because the host inquiry is executed.

Similarly when the third entry is selected as a target entry, when all the missing data is stored in the host cache 22, the write process can be completed without reading the missing data from the NAND flash 32 by executing the host inquiry. On the other hand, when at least part of the missing data is not stored in the write buffer 3141, it is necessary to read the missing data from the NAND flash 32.

As such, when the missing data ratio is high, a possibility that the missing data is all stored in the host cache 22 becomes low. Therefore, even when the host inquiry is executed, there is a high possibility that the missing data needs to be read from the NAND flash 32. Because the memory controller 31 transmits a request to the host 2 for each piece of 64B data, the number of issued requests increases as the missing data ratio becomes higher. Accordingly, the memory controller 31 of the memory system 3 according to the second embodiment executes the host inquiry only when the missing data ratio of the target entry is equal to or less than a threshold (for example, referred to as a second threshold). For example, it is assumed that the second threshold is set to 25%. When the first entry in FIG. 21 is selected as a target entry, the memory controller 31 executes the host inquiry. When the second or third entry is selected, the memory controller 31 does not execute the host inquiry. When the first or second entry in FIG. 21 is selected as a target entry and when the second threshold is set to 50%, the memory controller 31 executes the host inquiry. When the third entry is selected, the memory controller 31 does not execute the host inquiry.

As such, when a ratio of the missing data to the management size is equal to or less than the second threshold, the memory controller 31 requests the host 2 to transmit the missing data from the host cache 22 to the memory system 3 by transmitting an inquiry (for example, CXL.cache CLFlush or CXL.cache RdCurr) for designating the LA corresponding to the missing data to the host 2. When the ratio of the missing data to the management size is greater than the second threshold, the memory controller 31 reads the missing data from the NAND flash 32 without executing the host inquiry.

Figure 22:
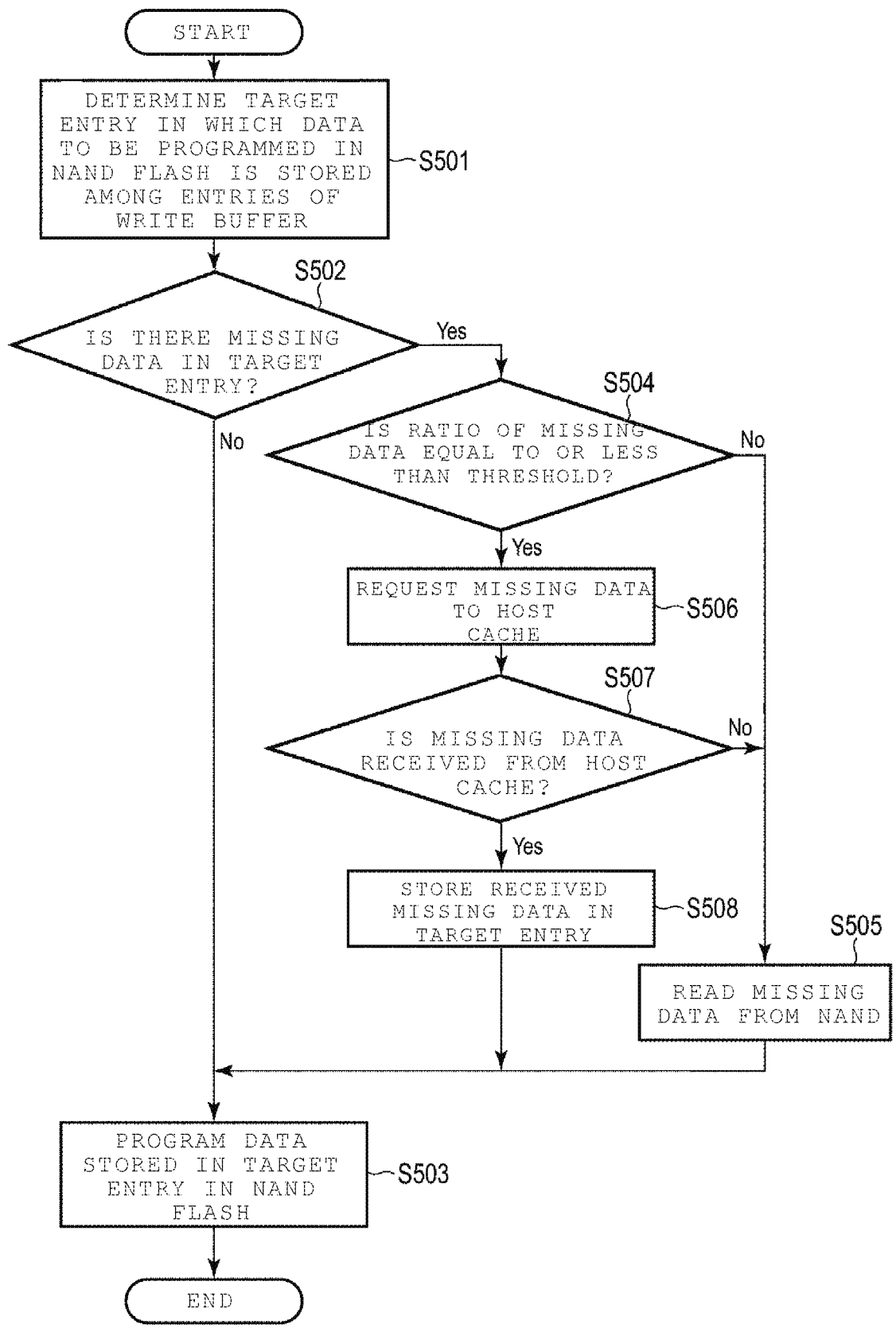
FIG. 22 is a flowchart illustrating an example of a procedure of a write process executed in the memory system according to the second embodiment.

Next, a write process referring to a missing data ratio of a target entry will be described. FIG. 22 is a flowchart illustrating an example of a procedure of a write process executed in the memory system according to the second embodiment.

First, the memory controller 31 determines a target entry in which data to be programmed in the NAND flash 32 is stored among the entries of the write buffer 3141 (step S501).

The memory controller 31 determines whether there is missing data in the target entry determined in step S501 (step S502).

When there is no missing data in the target entry (No in step S502), the memory controller 31 programs the data stored in the target entry in the NAND flash 32 (step S503).

When there is missing data in the target entry (Yes in step S502), the memory controller 31 determines whether the ratio of the missing data in the target entry is equal to or less than the threshold (step S504).

When the ratio of the missing data is greater than the threshold (No in step S504), the memory controller 31 reads the missing data from the NAND flash 32 (step S505). The memory controller 31 stores the read missing data in the target entry. Accordingly, there is no longer missing data in the target entry.

Then, the memory controller 31 programs the data stored in the target entry in the NAND flash 32 (step S503).

When the missing data ratio is equal to or less than the threshold (Yes in step S504), the memory controller 31 requests the missing data to the host cache 22 (step S506). Here, the memory controller 31 transmits the inquiry for designating the LA corresponding to the missing data to the host 2.

The memory controller 31 determines whether the missing data read from the host cache 22 is received (step S507). In other words, when the missing data is stored in the host cache 22, the memory controller 31 can receive the missing data stored in the host cache 22 from the host 2. When the missing data is not stored in the host cache 22, the memory controller 31 cannot receive the missing data from the host 2. Here, the memory controller 31 receives a completion response from the host 2 before the missing data is received from the host 2.

When the missing data is not received from the host cache 22 (No in step S507), the memory controller 31 reads the missing data from the NAND flash 32 (step S505). The memory controller 31 stores the read missing data in the target entry. Accordingly, there is no longer missing data in the target entry.

Then, the memory controller 31 programs the data stored in the target entry in the NAND flash 32 (step S503).

When the missing data is received from the host cache 22 (Yes in step S507), the memory controller 31 stores the received missing data in the target entry (step S508). Accordingly, there is no longer missing data in the target entry.

Then, the memory controller 31 programs the data stored in the target entry in the NAND flash 32 (step S503).

As described above, the memory controller 31 of the memory system 3 according to the second embodiment determines whether the missing data ratio of the target entry is equal to or less than the threshold in the write process. When the missing data ratio is equal to or less than the threshold, the memory controller 31 requests the host 2 to transmit the missing data from the host cache 22 to the memory system 3 by transmitting the inquiry for designating the LA corresponding to the missing data to the host 2. When the missing data ratio is greater than the threshold, the memory controller 31 reads the missing data from the NAND flash 32 without executing the host inquiry.

As such, by executing the host inquiry only when the missing data ratio is low, the memory controller 31 can avoid using a bandwidth between the host 2 and the memory system 3 wastefully.

Third Embodiment

Next, the memory system 3 according to a third embodiment will be described. To transmit a request issued when a host inquiry is made in a write process, a bandwidth between the host 2 and the memory system 3 (hereinafter referred to as a bandwidth of the CXL interface 311) is used. Therefore, when a usage ratio of the bandwidth of the CXL interface 311 is high and a host inquiry is executed, performance of a read/write process based on read/write request from the host 2 may be degraded.

Figure 23:
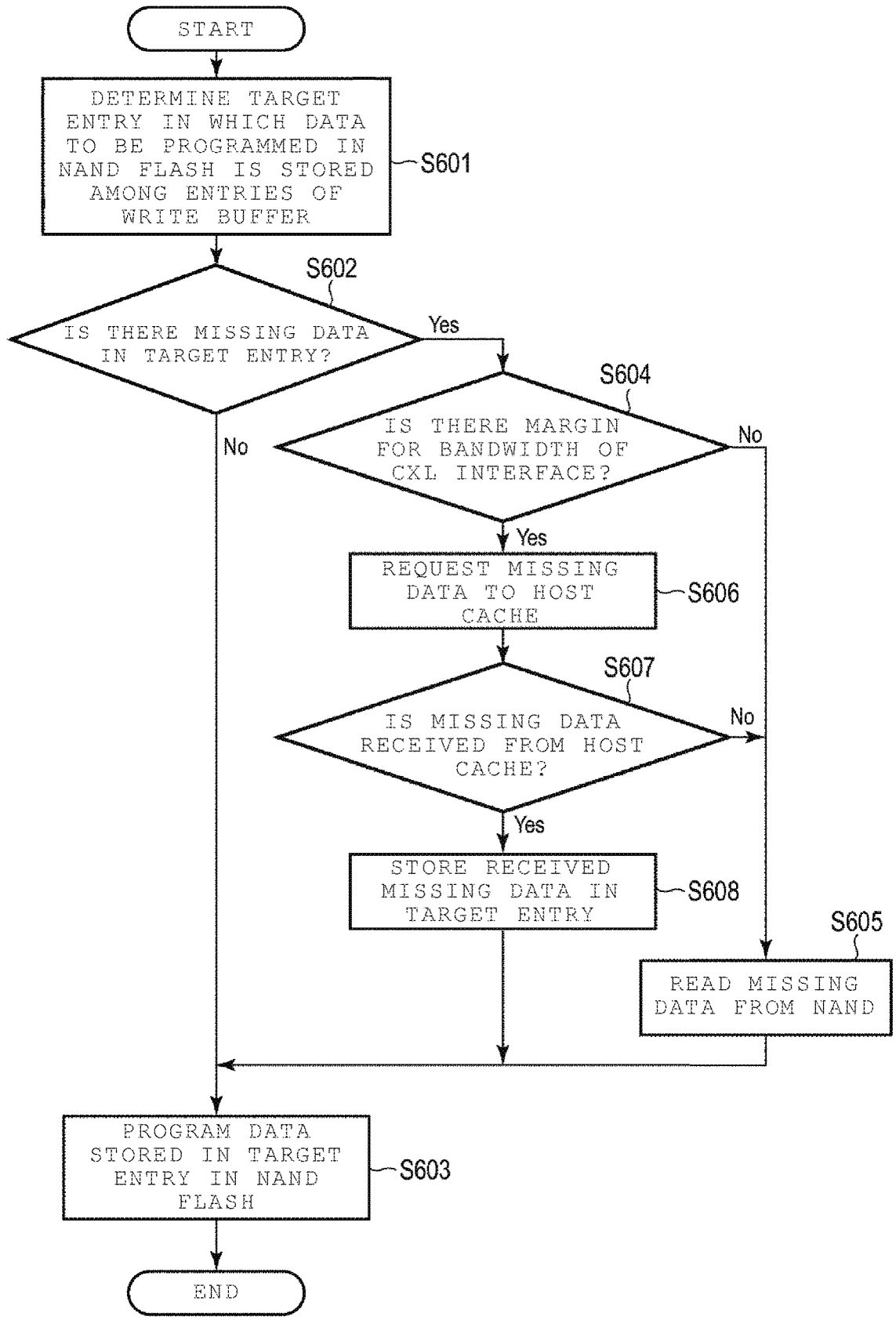
FIG. 23 is a flowchart illustrating an example of a procedure of a write process executed in a memory system according to a third embodiment.

To address such an issue, in the memory system 3 according to the third embodiment, whether to execute a host inquiry is determined with reference to a usage ratio of the bandwidth of the CXL interface 311. FIG. 23 is a flowchart illustrating an example of a procedure of a write process executed in a memory system according to the third embodiment.

First, the memory controller 31 determines the target entry in which the data to be programmed in the NAND flash 32 is stored among the entries of the write buffer 3141 (step S601).

The memory controller 31 determines whether there is missing data in the target entry determined in step S601 (step S602).

When there is no missing data in the target entry (No in step S602), the memory controller 31 programs the data stored in the target entry in the NAND flash 32 (step S603).

When there is missing data in the target entry (Yes in step S602), the memory controller 31 determines whether there is margin for the bandwidth of the CXL interface 311 (step S604). Here, the memory controller 31 determines whether the number of accesses indicating the number of times of access from the host 2 during a given time is equal to or less than a threshold (for example, referred to as a third threshold). When the number of accesses is equal to or less than the third threshold, the memory controller 31 recognizes that there is margin for the bandwidth of the CXL interface 311. The number of accesses can be indicated by a total of the number of read requests and the number of write requests (hereinafter also referred to as the number of read/write requests) received from the host 2 during the given time. That is, since a size of data transmitted in each read/write request is a fixed size (here, 64B), a usage ratio of the bandwidth of the CXL interface 311 can be obtained according to only the number of accesses, that is, the number of read/write requests. A method of counting the number of accesses is an example of a case where the CXL interface is used. Any method may be used as a method of calculating the usage ratio of the bandwidth. For example, it may be determined whether there is margin for the bandwidth of the CXL interface 311 by comparing a sum of an amount of data transmitted between the host 2 and the memory system 3 in the given time with the threshold.

When there is no margin for the bandwidth of the CXL interface 311, that is, the number of accesses exceeds the third threshold (No in step S604), the memory controller 31 reads the missing data from the NAND flash 32 without executing the host inquiry (step S605). The memory controller 31 stores the read missing data in the target entry. Accordingly, there is no longer missing data in the target entry.

Then, the memory controller 31 programs the data stored in the target entry in the NAND flash 32 (step S603).

When there is margin for the bandwidth of the CXL interface 311, that is, the number of accesses is equal to or less than the third threshold (Yes in step S604), the memory controller 31 requests the missing data to the host cache 22 (step S606). Here, the memory controller 31 transmits the inquiry for designating the LA corresponding to the missing data to the host 2.

The memory controller 31 determines whether the missing data read from the host cache 22 is received (step S607). In other words, when the missing data is stored in the host cache 22, the memory controller 31 can receive the missing data from the host 2. When the missing data is not stored in the host cache 22, the memory controller 31 cannot receive the missing data from the host 2. Here, the memory controller 31 receives a completion response from the host 2 before the missing data is received.

When the missing data is not received from the host cache 22 (No in step S607), the memory controller 31 reads the missing data from the NAND flash 32 (step S605). The memory controller 31 stores the read missing data in the target entry. Accordingly, there is no longer missing data in the target entry.

Then, the memory controller 31 programs the data stored in the target entry in the NAND flash 32 (step S603).

When the missing data is received from the host cache 22 (Yes in step S607), the memory controller 31 stores the received missing data in the target entry (step S608). Accordingly, there is no longer missing data in the target entry.

Then, the memory controller 31 programs the data stored in the target entry in the NAND flash 32 (step S603).

Here, a case where a usage ratio of the write buffer 3141 is also referred to in addition to the usage ratio of the bandwidth of the CXL interface 311 will be described. FIGS. 24A and 24B are diagrams illustrating an example of a usage ratio of the write buffer in the memory system according to the third embodiment. FIGS. 24A and 24B illustrate a case where the number of entries owned by the write buffer 3141 is four, to facilitate description. Here, the usage ratio of the write buffer 3141 is a ratio of entries in use to total entries provided in the write buffer 3141.

FIG. 24A illustrates the write buffer 3141 of which usage ratio is 75%.

The first entry is an entry in use. In the sector 0 of the first entry, valid data is not stored. In the sector 1 of the first entry, data 0x33333333 is stored. In the sector 2 of the first entry, data 0x22222222 is stored. In the sector 3 of the first entry, data 0x11111111 is stored. Therefore, the sector valid of the first entry is set to 0b1110.

The second entry is an entry in use. In the sector 0 of the second entry, data 0x55555555 is stored. In the sector 1 of the second entry, valid data is not stored. In the sector 2 of the second entry, data 0x44444444 is stored. In the sector 3 of the second entry, valid data is not stored. Therefore, the sector valid of the second entry is set to 0b0101.

The third entry is an entry in use. In the sector 0 of the third entry, data 0x66666666 is stored. In the sector 1 of the third entry, valid data is not stored. In the sector 2 of the third entry, valid data is not stored. In the sector 3 of the third entry, valid data is not stored. Therefore, the sector valid of the third entry is set to 0b0001.

The fourth entry is an available entry. Therefore, valid data is not stored in any sector of the fourth entry.

As such, in the write buffer 3141 in FIG. 24A, three entries are in use among four entries. Therefore, a usage ratio is 75%.

FIG. 24B illustrates the write buffer 3141 of which usage ratio is 25%.

The first entry is an available entry. Therefore, valid data is not stored in any sector of the first entry.

The second entry is an available entry. Therefore, valid data is not stored in any sector of the second entry.

The third entry is an entry in use. In the sector 0 of the third entry, data 0x66666666 is stored. In the sector 1 of the third entry, valid data is not stored. In the sector 2 of the third entry, data 0x88888888 is stored. In the sector 3 of the third entry, valid data is not stored. Therefore, the sector valid of the third entry is set to 0b0101.

The fourth entry is an available entry. Therefore, valid data is not stored in any sector of the fourth entry.

In the memory system 3 according to the third embodiment, the memory controller 31 does not execute the host inquiry when there is no margin for the bandwidth of the CXL interface 311. However, there is a time delay until a write process is executed when the usage ratio of the write buffer 3141 is low because new data corresponding to a subsequent write request can be stored in an available entry of the write buffer 3141.

For example, the memory controller 31 may determine that there is margin for a quantity of available entries of the write buffer 3141 when the usage ratio of the write buffer 3141 is equal to or less than 50%.

Figure 25:
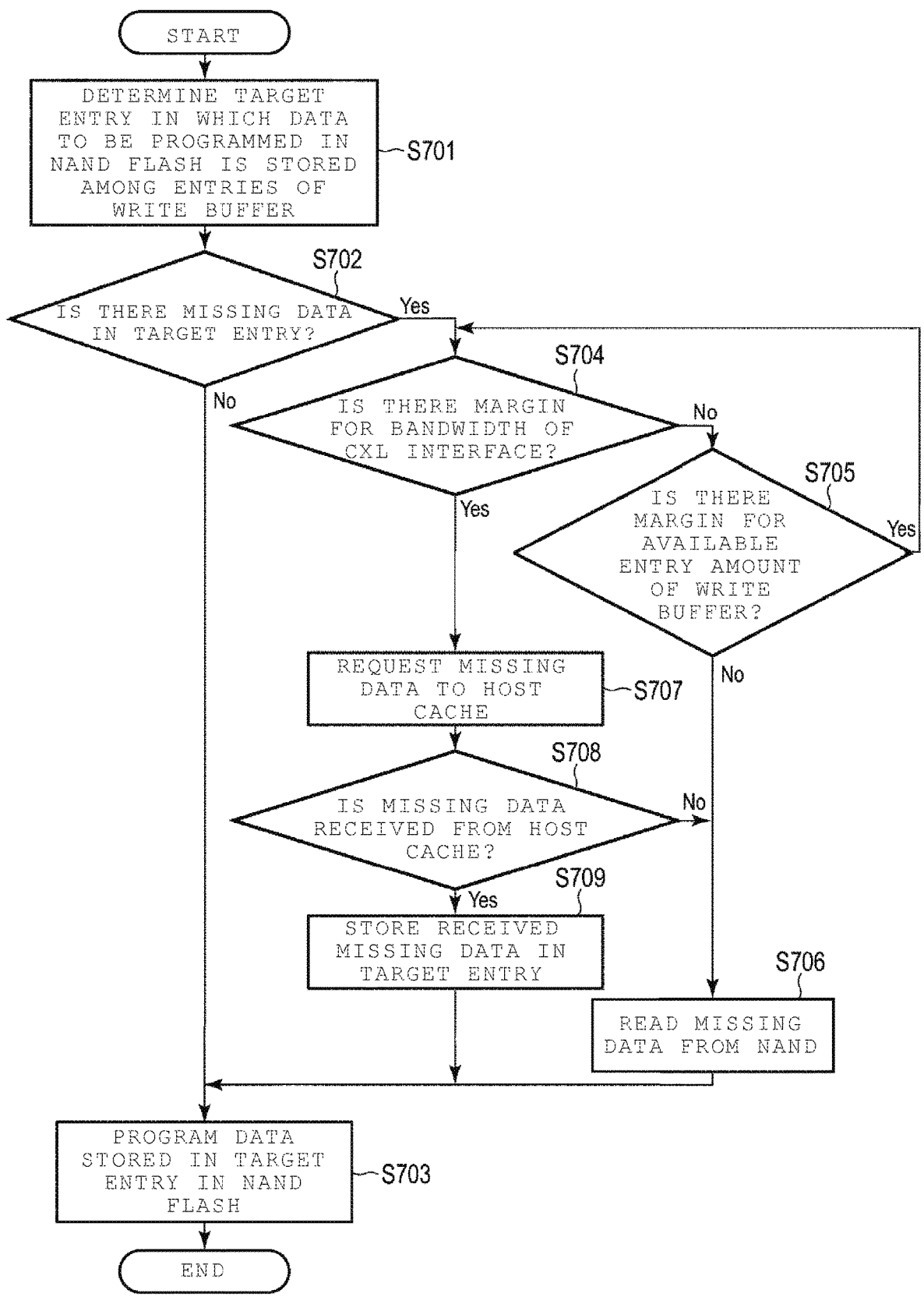
FIG. 25 is a flowchart illustrating another example of the procedure of the write process executed in the memory system according to the third embodiment.

Next, a write process when a bandwidth of the CXL interface 311 and a usage ratio of the write buffer 3141 are referred to will be described. FIG. 25 is a flowchart illustrating another example of the procedure of the write process executed in the memory system according to the third embodiment.

First, the memory controller 31 determines a target entry in which data to be programmed in the NAND flash 32 is stored among the entries of the write buffer 3141 (step S701).

The memory controller 31 determines whether there is missing data in the target entry determined in step S701 (S702).

When there is no missing data in the target entry (No in step S702), the memory controller 31 programs the data stored in the target entry in the NAND flash 32 (step S703).

When there is missing data in the target entry (Yes in S702), the memory controller 31 determines whether there is margin for the bandwidth of the CXL interface 311 (step S704).

When there is no margin for the bandwidth of the CXL interface 311 (No in step S704), the memory controller 31 determines whether there is margin for the quantity of the available entries of the write buffer 3141 (step S705). Here, the memory controller 31 determines whether there is margin for the quantity of the available entries of the write buffer 3141, for example, by determining whether the usage ratio of the write buffer 3141 is equal to or less than a threshold (referred to as a fourth threshold). The usage ratio of the write buffer 3141 is represented by a ratio of available entries to a total number of the entries of the write buffer 3141.

When there is margin for the quantity of the available entries of the write buffer 3141 (Yes in step S705), the memory controller 31 waits for a predetermined time and then determines again whether there is margin for the bandwidth of the CXL interface 311 (step S704). That is, the memory controller 31 delays the program operation until there is margin for the bandwidth of the CXL interface 311 while there is margin for the quantity of the available entries of the write buffer 3141. When margin for the bandwidth of the CXL interface 311 is made due to a decrease in the number of accesses while there is margin for the available entries of the write buffer 3141, the memory controller 31 executes the host inquiry.

That is, when there is no margin for the quantity of the available entries of the write buffer 3141 (No in step S705), the memory controller 31 reads the missing data from the NAND flash 32 (step S706). The memory controller 31 stores the read missing data in the target entry. Accordingly, there is no longer missing data in the target entry.

Then, the memory controller 31 programs the data stored in the target entry in the NAND flash 32 (step S703).

When there is margin for the bandwidth of the CXL interface 311 (Yes in step S704), the memory controller 31 requests the missing data to the host cache 22 (step S707). Here, the memory controller 31 transmits the request for designating the LA corresponding to the missing data to the host 2.

The memory controller 31 determines whether the missing data read from the host cache 22 is received (step S708). In other words, when the missing data is stored in the host cache 22, the memory controller 31 can receive the missing data from the host 2. When the missing data is not stored in the host cache 22, the memory controller 31 cannot receive the missing data from the host 2. Here, the memory controller 31 receives a completion response from the host 2 before the missing data is received.

When the missing data is not received from the host cache 22 (No in step S708), the memory controller 31 reads the missing data from the NAND flash 32 (step S706). The memory controller 31 stores the read missing data in the target entry. Accordingly, there is no longer missing data in the target entry.

Then, the memory controller 31 programs the data stored in the target entry in the NAND flash 32 (step S703).

When the missing data is received from the host cache 22 (Yes in step S708), the memory controller 31 stores the received missing data in the target entry (step S709). Accordingly, there is no longer missing data in the target entry.

Then, the memory controller 31 programs the data stored in the target entry in the NAND flash 32 (step S703).

As described above, the memory controller 31 of the memory system 3 according to the third embodiment determines whether there is margin for the bandwidth of the CXL interface 311 in the write process. When the number of accesses during the given time is equal to or less than the threshold, the memory controller 31 requests the host 2 to transmit the missing data from the host cache 22 to the memory system 3 by transmitting the request for designating the LA corresponding to the missing data to the host 2. When the number of accesses exceeds the threshold, the memory system 31 does not execute the host inquiry.

Accordingly, by executing the host inquiry when the usage ratio of the bandwidth of the CXL interface 311 is high, it is possible to prevent performance of the read/write process based on a read/write request from the host 2 from being degraded.

When the number of accesses exceeds the threshold, the memory controller 31 of the memory system 3 according to the third embodiment determines whether there is margin for the quantity of the available entries of the write buffer 3141. While there is margin for the quantity of the available entries of the write buffer 3141, that is, when the usage ratio of the write buffer 3141 is equal to or less than the threshold, a given time is awaited. Thereafter, the memory controller 31 determines again whether there is margin for the bandwidth of the CXL interface 311. When the margin for the bandwidth of the CXL interface 311 is made due to a decrease in the number of accesses while there is margin for the quantity of the available entries of the write buffer 3141, the memory controller 31 executes the host inquiry.

As such, while there is margin for the usage ratio of the write buffer 3141, the memory controller 31 can wait for the usage ratio of the bandwidth of the CXL interface 311 to decrease by delaying the write process.

Fourth Embodiment

When missing data is read from the NAND flash 32, similarly to when data is read from or written into the NAND flash 32 based on a read/write request from the host 2, a bandwidth between the memory controller 31 and the NAND flash 32 (hereinafter referred to as a bandwidth of the NAND flash interface 316) and processing resources in the NAND flash 32 (NAND flash chip 321) are used. Hereinafter, the bandwidth between the memory controller 31 and the NAND flash 32 is referred to as a bandwidth of the NAND flash interface 316. The processing resources in the NAND flash chip 321 are resources in the NAND flash chip 321 necessary for a data write operation, a data read operation, and a data erasing operation, for example, circuits such as a data buffer, an address decoder, a sensor amplifier, and a sequencer.

When a process of reading missing data from the NAND flash 32 is executed when there is no margin for the bandwidth of the NAND flash interface or no margin for processing sources of the NAND flash chip 321 because of reading or writing of data from or in the NAND flash 32 based on the read/write request from the host 2, the performance of the read/write process based on the read/write request from the host 2 can be degraded. Conversely, when the missing data is read from the NAND flash 32 when there are both margin for the bandwidth of the NAND flash interface 316 and margin for the processing resources of the NAND flash chip 321, there is no influence on the performance of the read/write process based on the read/write request from the host 2.

Because of the above, in the memory system 3 according to the fourth embodiment, the degree of margin for the bandwidth of the NAND flash interface and the degree of margin for the processing sources of the NAND flash chip 321 are referred to reading of the missing data. The degrees of margin can be determined, for example, using the following values.

The number of requests of which issuing to the NAND flash chip 321 is awaited

The number of requests for which a process by the NAND flash chip 321 is not completed among the requests issued to the NAND flash chip 321

Here, the requests for the NAND flash chip 321 include a program request (NAND program command) and a read request (NAND read command).

When the number of requests of which issuing to the NAND flash chip 321 is awaited, that is, the number of requests to the NAND flash 32 stored in the NAND flash interface 316, is equal to or less than a threshold, it can be determined that there is margin for the bandwidth of the NAND flash interface 316. When the number of requests for which the process by the NAND flash chip 321 is not completed among the requests issued to the NAND flash chip 321, that is, the number of requests which are being processed in the NAND flash 32, is equal to or less than a threshold, it can be determined that there is a margin for the processing resources of the NAND flash chip 321.

Figure 26:
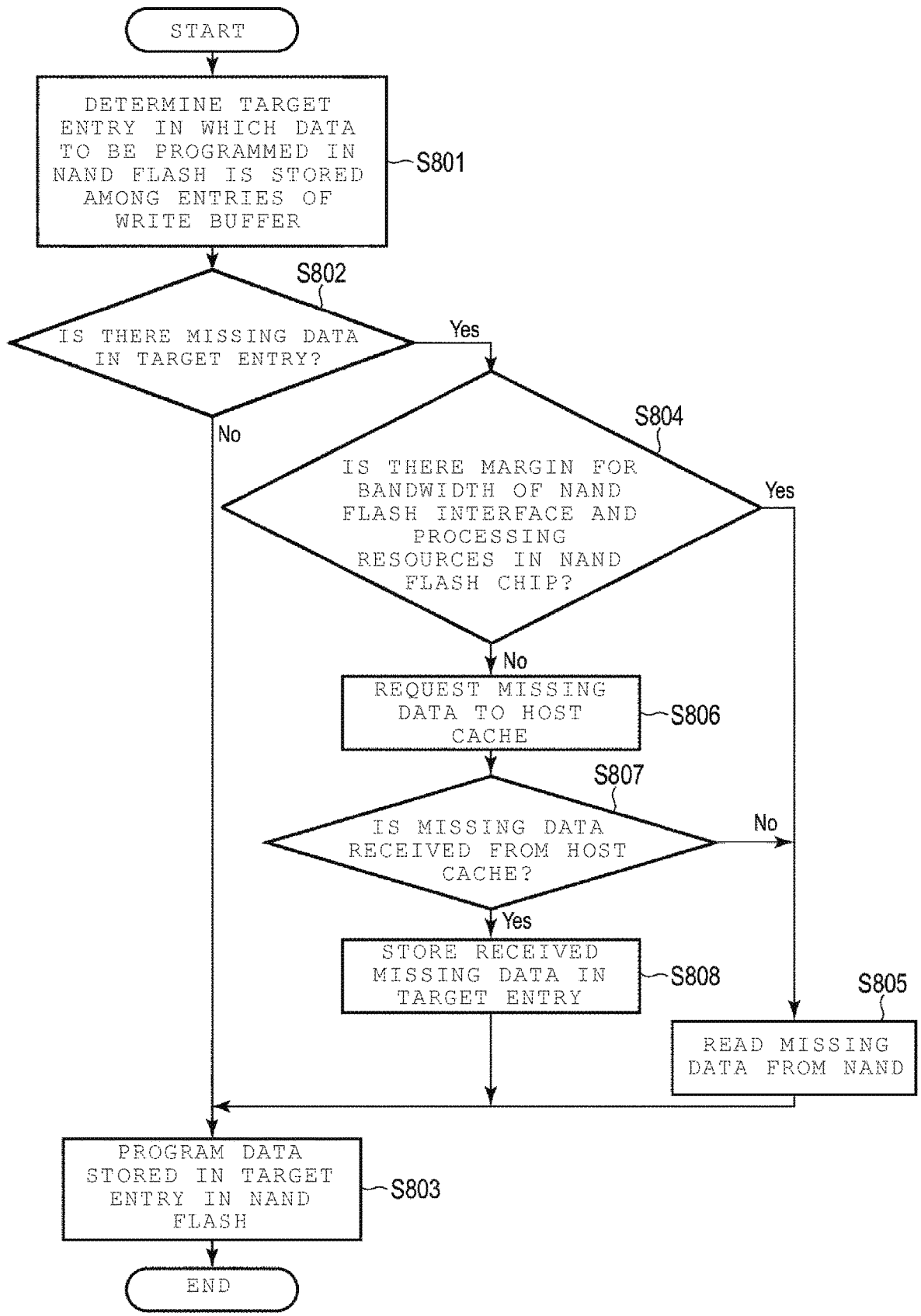
FIG. 26 is a flowchart illustrating an example of a procedure of a write process executed in a memory system according to a fourth embodiment.

FIG. 26 is a flowchart illustrating an example of a procedure of a write process executed in the memory system according to the fourth embodiment.

First, the memory controller 31 determines a target entry in which data to be programmed in the NAND flash 32 is stored among the entries of the write buffer 3141 (step S801).

The memory controller 31 determines whether there is missing data in the target entry determined in step S801 (step S802).

When there is no missing data in the target entry (No in step S802), the memory controller 31 programs the data stored in the target entry in the NAND flash 32 (step S803).

When there is missing data in the target entry (Yes in step S802), the memory controller 31 determines whether there is margin for both the bandwidth of the NAND flash interface 316 and the processing resources of the NAND flash chip 321 (step S804). Here, when the number of requests (program requests and read requests) for the NAND flash 32 stored by the NAND flash interface 316 is less than a threshold (for example, referred to as a fifth threshold), the memory controller 31 determines that there is margin for the bandwidth of the NAND flash interface 316. When the number of requests which are being processed in the NAND flash 32 is less than a threshold (for example, referred to as a sixth threshold), the memory controller 31 determines that there is margin for the processing resources of the NAND flash chip 321. When there is no margin for either the bandwidth of the NAND flash interface 316 or the processing resources of the NAND flash chip 321, the memory controller 31 determines No in step S804. When there is margin for both the bandwidth of the NAND flash interface 316 and the processing resources of the NAND flash chip 321, the memory controller 31 determines Yes in step S804.

When there is margin for both the bandwidth of the NAND flash interface 316 and the processing resources of the NAND flash chip 321 (Yes in step S804), the memory controller 31 reads the missing data from the NAND flash 32 (step S805). The memory controller 31 stores the read missing data in the target entry. Accordingly, there is no longer missing data in the target entry.

Then, the memory controller 31 programs the data stored in the target entry in the NAND flash 32 (step S803).

When there is no margin for either the bandwidth of the NAND flash interface 316 or the processing resources of the NAND flash chip 321 (No in step S804), the memory controller 31 requests the missing data to the host cache 22 (step S806). Here, the memory controller 31 transmits the request for designating the LA corresponding to the missing data to the host 2.

The memory controller 31 determines whether the missing data is received from the host cache 22 (step S807). In other words, when the missing data is stored in the host cache 22, the memory controller 31 can receive the missing data from the host 2. When the missing data is not stored in the host cache 22, the memory controller 31 cannot receive the missing data from the host 2. Here, the memory controller 31 receives a completion response from the host 2 before the missing data is received.

When the missing data is not received from the host cache 22 (No in step S807), the memory controller 31 reads the missing data from the NAND flash 32 (step S805). The memory controller 31 stores the read missing data in the target entry. Accordingly, there is no longer missing data in the target entry.

Then, the memory controller 31 programs the data stored in the target entry in the NAND flash 32 (step S803).

When the missing data is received from the host cache 22 (Yes in step S807), the memory controller 31 stores the received missing data in the target entry (step S808). Accordingly, there is no longer missing data in the target entry.

Then, the memory controller 31 programs the data stored in the target entry in the NAND flash 32 (step S803).

As described above, the memory controller 31 of the memory system 3 according to the fourth embodiment refers to whether there is margin for both the bandwidth of the NAND flash interface 316 and the processing resources of the NAND flash chip 321 in the write process. When there is margin for both the bandwidth of the NAND flash interface 316 and the processing resources of the NAND flash chip 321, the memory controller 31 reads the missing data from the NAND flash 32 without executing the host inquiry. When there is no margin for either the bandwidth of the NAND flash interface 316 or the processing resources of the NAND flash chip 321, the memory controller 31 executes the host inquiry.

When there is margin for the bandwidth of the NAND flash interface 316 and the processing resources of the NAND flash chip 321, there is no influence on processing performance of the memory system 3 even when the missing data is read from the NAND flash 32. Therefore, the memory controller 31 can determine whether the host inquiry is executed according to a situation of the memory system 3.

Fifth Embodiment

An application program executed in the host 2 may execute an operation of reading data on the memory system 3, calculating based on the read data, and writing the calculated data back to the memory system 3 in many cases. That is, there is a high possibility that the data rewritten on the host cache 22 has been read in advance from the memory system 3.

Therefore, the memory controller 31 of the memory system 3 according to the fifth embodiment stores a logical address corresponding to the read data. When the logical address corresponding to the missing data matches the logical address stored by the memory controller 31, a host inquiry is executed.

Figure 27:
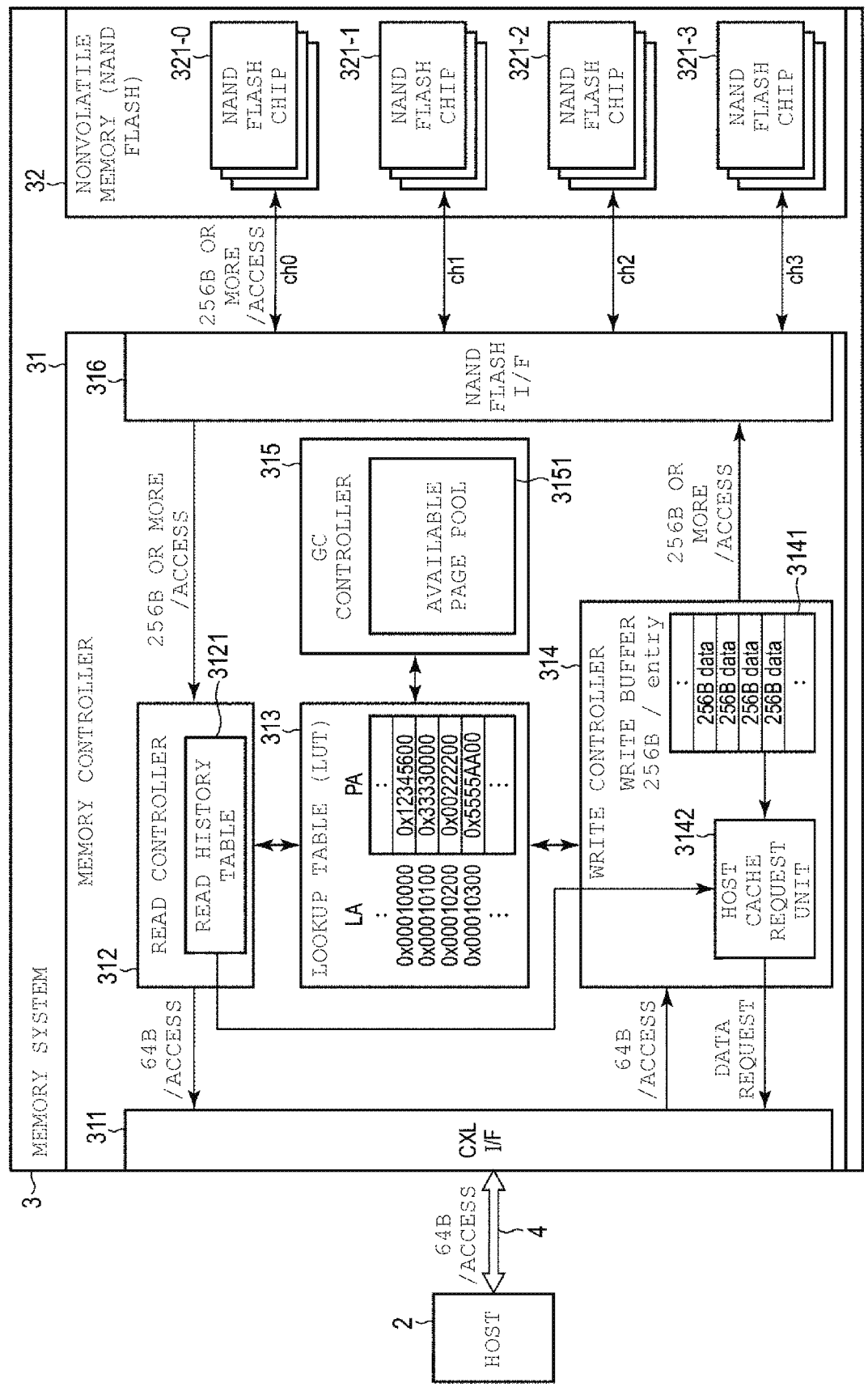
FIG. 27 is a block diagram illustrating a configuration example of each of a memory controller and a nonvolatile memory provided in a memory system according to a fifth embodiment.

First, a configuration of the memory system 3 according to the fifth embodiment will be described. FIG. 27 is a block diagram illustrating a configuration example of each of the memory controller and the nonvolatile memory provided in the memory system according to the fifth embodiment. Here, differences from the memory system 3 according to the first embodiment described with reference to FIG. 2 will be mainly described.

The read controller 312 includes a read history table 3121. The read history table 3121 is a table in which a logical address corresponding to each piece of data read from the NAND flash 32 based on each read request received from the host 2 is stored. The read history table 3121 stores a predetermined number of logical addresses recently read from the NAND flash 32 based on each read request from the host 2. The number of logical addresses that can be stored in the read history table 3121 can be determined based on, for example, a size of the host cache 22. When a capacity of the host cache 22 is 128 MB, it can be estimated at a high probability whether the host cache 22 stores the missing data by storing 2 M (=128 MB/64B) logical address which is a quotient obtained by dividing the capacity (128 MB) of the host cache 22 by access granularity (64B).

The read controller 312 stores the LA corresponding to each piece of data (64B data) read from the NAND flash 32 in the read history table 3121 based on each read request received from the host 2. When the write controller 314 identifies the logical address corresponding to the missing data, the host cache request unit 3142 determines whether the logical address corresponding to the missing data is stored in the read history table 3121. For example, a method such as a counting bloom filter may be used for the read history table. When the read history table is stored, the logical address is hashed and stored at a corresponding memory position corresponding. When the logical address corresponding to the missing data is searched for from the read history table 3121, the logical address is hashed and referred to the corresponding memory position, and is determined to be a hit when there is valid data. When it is necessary to determine a request to the host cache, as described above, it is not realistic to compare 2 M logical addresses with each other in sequence from the viewpoint of a calculation amount. Therefore, a method that allows a false positive but reduces a calculation amount such as a bloom filter is necessary. A false positive is allowed in a bloom filter. However, a hit or a miss merely occur in the host cache 22. That is, in the host inquiry, a case where the host cache 22 does not store the missing data is allowed, such that a problem does not occur due to a false positive of the bloom filter.

Figure 28:
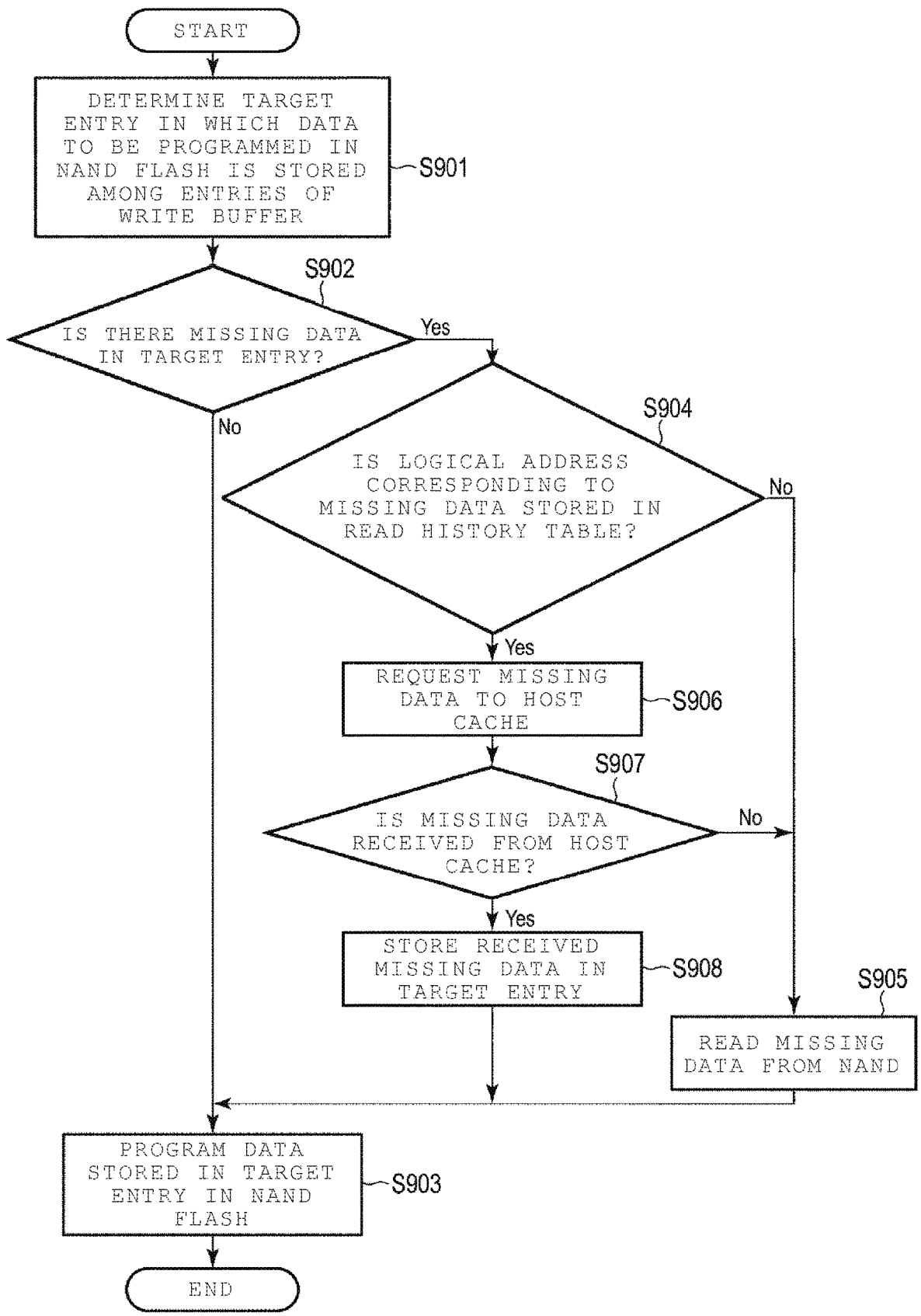
FIG. 28 is a flowchart illustrating an example of a procedure of a write process executed in the memory system according to the fifth embodiment.

Next, a write process referring to the read history table 3121 will be described. FIG. 28 is a flowchart illustrating an example of a procedure of a write process executed in the memory system according to the fifth embodiment.

First, the memory controller 31 determines a target entry in which data to be programmed in the NAND flash 32 is stored among the entries of the write buffer 3141 (step S901).

The memory controller 31 determines whether there is missing data in the target entry determined in step S901 (step S902).

When there is no missing data in the target entry (No in step S902), the memory controller 31 programs the data stored in the target entry in the NAND flash 32 (step S903).

When there is missing data in the target entry (Yes in step S902), the memory controller 31 determines whether the logical address corresponding to the missing data is stored in the read history table 3121 (step S904).

When the logical address corresponding to the missing data is not stored in the read history table 3121 (No in step S904), the memory controller 31 reads the missing data from the NAND flash 32 (step S905). The memory controller 31 stores the read missing data in the target entry. Accordingly, there is no longer missing data in the target entry.

Then, the memory controller 31 programs the data stored in the target entry in the NAND flash 32 (step S903).

When the logical address corresponding to the missing data is stored in the read history table 3121 (Yes in step S904), the memory controller 31 requests the missing data to the host cache 22 (step S906). Here, the memory controller 31 transmits a request for designating the logical address corresponding to the missing data to the host 2.

The memory controller 31 determines whether the missing data read from the host cache 22 is received (step S907). In other words, when the missing data is stored in the host cache 22, the memory controller 31 can receive the missing data from the host 2. When the missing data is not stored in the host cache 22, the memory controller 31 cannot receive the missing data from the host 2. Here, the memory controller 31 receives a completion response from the host 2 before the missing data is received.

When the missing data is not received from the host cache 22 (No in step S907), the memory controller 31 reads the missing data from the NAND flash 32 (step S805). The memory controller 31 stores the read missing data in the target entry. Accordingly, there is no longer missing data in the target entry.

Then, the memory controller 31 programs the data stored in the target entry in the NAND flash 32 (step S903).

When the missing data is received from the host cache 22 (Yes in step S907), the memory controller 31 stores the received missing data in the target entry (step S908). Accordingly, there is no longer missing data in the target entry.

Then, the memory controller 31 programs the data stored in the target entry in the NAND flash 32 (step S903).

As described above, the memory controller 31 of the memory system 3 according to the fifth embodiment stores the logical address designated by a read command received from the host 2 using the read history table 3121. The memory controller 31 determines whether the logical address corresponding to the missing data is stored in the read history table 3121. When the logical address corresponding to the missing data is stored in the read history table 3121, the memory controller 31 executes the host inquiry.

Accordingly, when there is a high possibility that the missing data is stored in the host cache 22, the memory controller 31 can execute the host inquiry. When there is a low possibility that the missing data is stored in the host cache 22, the memory controller 31 avoids executing the host inquiry. The memory controller 31 can prevent a time necessary for the write process from increasing when the missing data cannot be acquired by the host inquiry and the host inquiry becomes an unnecessary operation.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a nonvolatile memory; and
a memory controller including:
 a host interface configured to communicate with a host in accordance with a first interface protocol, according to which write data is communicated in units of a sector having a first size;
 a memory interface configured to communicate with the nonvolatile memory in accordance with a second interface protocol, write data is communicated in units of a second size greater than the first size; and
 a write buffer configured to temporarily store data of a third size in each of a plurality of entries thereof, the third size being equal to the second size or 1/N of the second size, N being a natural number, each of the entries being reserved to store data of a plurality of sectors that are associated with a continuous logical address range, each of the plurality of sectors having the first size, wherein
the memory controller is configured to:
 select one of the entries in which write data is to be stored;
 determine whether the selected entry is missing data of any sector;
 in response to determining that the selected entry is missing data of at least one sector, perform a host inquiry by transmitting a request to the host for the missing data via the host interface;
 in response to receiving the missing data from the host via the host interface, store the missing data in the selected entry; and
 when the selected entry is not missing data from any of the sectors, perform a write operation to store the data of the third size in the selected entry into the nonvolatile memory at a continuous physical address range thereof.

2. The memory system according to claim 1, wherein the memory controller is further configured to maintain an address conversion table in which a correspondence between logical addresses and physical addresses is stored in units of the third size.

3. The memory system according to claim 2, wherein the memory controller is further configured to update the address conversion table such that a continuous logical address range corresponding to the write data stored in the nonvolatile memory is associated with the continuous physical address range of the nonvolatile memory.

4. The memory system according to claim 1, wherein the memory controller is further configured to:
determine a first parameter value representing a ratio of vacant entries in the write buffer that store no data with respect to the total size of the write buffer; and
select one of the entries in which write data is to be stored when the first parameter value drops to a first threshold.

5. The memory system according to claim 1, wherein the memory controller is further configured to perform a read operation to read data associated with a same logical address range as the missing data from the nonvolatile memory and store the read data in the selected entry.

6. The memory system according to claim 5, wherein the memory controller is further configured to:
determine a second parameter value representing a ratio of a size of missing data in the selected entry divided by the third size; and
perform one of the host inquiry and the read operation based on comparison of the second parameter value with a second threshold.

7. The memory system according to claim 6, wherein the memory controller is further configured to:
perform the host inquiry when the second parameter value is less than the second threshold; and
perform the read operation, when the second parameter value is greater than the second threshold.

8. The memory system according to claim 5, wherein the memory controller is further configured to:
determine a third parameter value representing a use ratio of communication by the host interface; and
perform one of the host inquiry and the read operation based on comparison of the third parameter value with a third threshold.

9. The memory system according to claim 8, wherein the memory controller is further configured to:
perform the host inquiry when the third parameter value is less than the third threshold; and
perform the read operation, when the third parameter value is greater than the third threshold.

10. The memory system according to claim 8, wherein the memory controller is further configured to:
determine a fourth parameter value representing a ratio of vacant entries in the write buffer that store no data with respect to the total size of the write buffer; and
perform one of the host inquiry and the read operation also based on comparison of the fourth parameter value with a fourth threshold.

11. The memory system according to claim 10, wherein the memory controller is further configured to:
perform the host inquiry when the third parameter value is less than the third threshold; and
perform the read operation, when the third parameter value is greater than the third threshold and the fourth parameter value is less than the fourth threshold.

12. The memory system according to claim 5, wherein the memory controller is further configured to:
determine a fifth parameter value representing a number of requests from the host that have not been processed by the memory controller; and
perform one of the host inquiry and the read operation based on comparison of the fifth parameter value with a fifth threshold.

13. The memory system according to claim 12, wherein the memory controller is further configured to:
determine a sixth parameter value representing a number of requests from the host that are being processed by the memory controller; and
perform one of the host inquiry and the read operation also based on comparison of the sixth parameter value with a sixth threshold.

14. The memory system according to claim 13, wherein the memory controller is further configured to:
perform the host inquiry when the fifth parameter value is less than the fifth threshold and the sixth parameter value is less than the sixth threshold; and
perform the read operation, when the fifth parameter value is greater than the fifth threshold and when the sixth parameter value is greater than the sixth threshold.

15. The memory system according to claim 5, wherein the memory controller is further configured to:
maintain a read history table indicating a logical address corresponding to data that have been read from the nonvolatile memory;
determine whether a logical address corresponding to the missing data is included in the read history table; and
perform one of the host inquiry and the read operation based on whether the logical address corresponding to the missing data is included in the read history table.

16. The memory system according to claim 15, wherein the memory controller is further configured to:
perform the host inquiry when the logical address corresponding to the missing data is included in the read history table; and
perform the read operation, when the logical address corresponding to the missing data is not included in the read history table.

17. An information processing system comprising:
the memory system according to claim 1; and
the host, which includes a cache memory configured to store data in each of a plurality of cache lines, each of which has the first size, wherein
the host is configured to, in response to receiving the request for the missing data, search the cache memory for the missing data and transmit the missing data to the memory system when the missing data is stored in one or more of the cache lines of the cache memory.

18. A method for controlling a memory system comprising:
a nonvolatile memory; and
a memory controller including:
a host interface configured to communicate with a host in accordance with a first interface protocol, according to which write data is communicated in units of a sector having a first size;
a memory interface configured to communicate with the nonvolatile memory in accordance with a second interface protocol, write data is communicated in units of a second size greater than the first size; and
a write buffer configured to temporarily store data of a third size in each of a plurality of entries thereof, each of the entries being reserved to store data of a plurality of sectors that are associated with a continuous logical address range, the third size being equal to the second size or 1/N of the second size, N being a natural number, each of the plurality of sectors having the first size, the method comprising:
selecting one of the entries in which write data is to be stored;
determining whether the selected entry is missing data of any sector;
in response to determining that the selected entry is missing data of at least one sector, performing a host inquiry by transmitting a request to the host for the missing data via the host interface;
in response to receiving the missing data from the host via the host interface, storing the missing data in the selected entry; and
when the selected entry is not missing data from any of the sectors, performing a write operation to store the data of the second size in the selected entry into the nonvolatile memory at a continuous physical address range thereof.

19. The method according to claim 18, further comprising:
   maintaining an address conversion table in which a correspondence between logical addresses and physical addresses is stored in unit of the third size of data.

20. The method according to claim 19, further comprising:
   updating the address conversion table such that a continuous logical address range corresponding to the write data stored in the nonvolatile memory is associated with the continuous physical address range of the nonvolatile memory.

* * * * *